United States Patent
Abedini et al.

(10) Patent No.: US 12,156,262 B2
(45) Date of Patent: Nov. 26, 2024

(54) FACILITATING THE USE OF RANDOM ACCESS CHANNEL OCCASIONS FOR FULL-DUPLEX COMMUNICATION

(71) Applicant: QUALCOMM Incorporated, San Diego, CA (US)

(72) Inventors: Navid Abedini, Basking Ridge, NJ (US); Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 17/647,959

(22) Filed: Jan. 13, 2022

(65) Prior Publication Data

US 2023/0224977 A1    Jul. 13, 2023

(51) Int. Cl.
*H04W 74/0833* (2024.01)
*H04L 5/14* (2006.01)
*H04W 56/00* (2009.01)
*H04W 72/121* (2023.01)
*H04W 72/1263* (2023.01)
*H04W 74/08* (2024.01)

(52) U.S. Cl.
CPC ........... *H04W 74/0841* (2013.01); *H04L 5/14* (2013.01); *H04W 56/001* (2013.01); *H04W 72/1263* (2013.01); *H04W 74/0866* (2013.01)

(58) Field of Classification Search
CPC ........... H04W 74/0841; H04W 56/001; H04W 72/1263; H04W 74/0866; H04W 72/121; H04W 74/0833; H04L 5/14
See application file for complete search history.

(56) References Cited

U.S. PATENT DOCUMENTS

2021/0014902 A1*  1/2021  Guo .................... H04W 56/001
2022/0217790 A1*  7/2022  Qiu .................... H04W 56/0045
(Continued)

FOREIGN PATENT DOCUMENTS

WO    2021177741 A1    9/2021

OTHER PUBLICATIONS

International Search Report and Written Opinion—PCT/US2022/081688—ISA/EPO—Apr. 6, 2023.
(Continued)

*Primary Examiner* — Harry H Kim
(74) *Attorney, Agent, or Firm* — Patterson & Sheridan, LLP

(57) ABSTRACT

Certain aspects of the present disclosure provide techniques for facilitating the use of random access channel occasions for full-duplex communication. An example method performed by a user equipment (UE) in a first group of UEs may include receiving, from a base station (BS) of a wireless network, a first indication indicating, from a first plurality of random access channel occasions (ROs) not available for use by a second group of UEs within the wireless network, a set of ROs that are available for use by the first group of UEs within the wireless network, receiving a first signal of a plurality of signals transmitted by the BS, and transmitting, in response to receiving the first signal, a random access preamble in a first RO of the set of ROs based on a mapping between the first signal and the first RO.

30 Claims, 9 Drawing Sheets

(56) References Cited

U.S. PATENT DOCUMENTS

| | | | |
|---|---|---|---|
| 2022/0256610 A1* | 8/2022 | Lin | H04W 74/004 |
| 2023/0054111 A1* | 2/2023 | Rudolf | H04W 74/0833 |
| 2023/0179279 A1* | 6/2023 | Huang | H04B 7/088 |
| | | | 370/252 |
| 2023/0180225 A1* | 6/2023 | Babaei | H04W 72/54 |
| | | | 370/329 |
| 2023/0188229 A1* | 6/2023 | Xu | H04B 17/336 |
| | | | 370/329 |
| 2023/0189088 A1* | 6/2023 | Shin | H04W 36/08 |
| | | | 455/427 |
| 2023/0216616 A1* | 7/2023 | Lin | H04L 1/1861 |
| | | | 370/329 |
| 2024/0032103 A1* | 1/2024 | Rastegardoost | H04W 74/0833 |
| 2024/0049307 A1* | 2/2024 | Lin | H04W 74/0833 |
| 2024/0057149 A1* | 2/2024 | Pan | H04W 74/0833 |

OTHER PUBLICATIONS

Nokia., et al., "Half-Duplex Operation for Reduced Capability Devices", 3GPP TSG RAN WG1 Meeting #106bis-e, R1-2109311, 3rd Generation Partnership Project (3GPP), Mobile Competence Centre, 650, Route Des Lucioles, F-06921, Sophia-Antipolis Cedex, France, vol. RAN WG1, No. e-Meeting, Oct. 11, 2021, Oct. 19, 2021, Oct. 1, 2021, 7 Pages, XP052058265, p. 1, Line 1-11, p. 4, Line 43, p. 5, Line 2.

3GPP TS 38.213: "3rd Generation Partnership Project, Technical Specification Group Radio Access Network, NR, Physical Layer Procedures for Control (Release 16)," 3GPP TS 38.213, V16.3.0, Sep. 2020, pp. 1-179, XP051961308, Section 8.1.

* cited by examiner

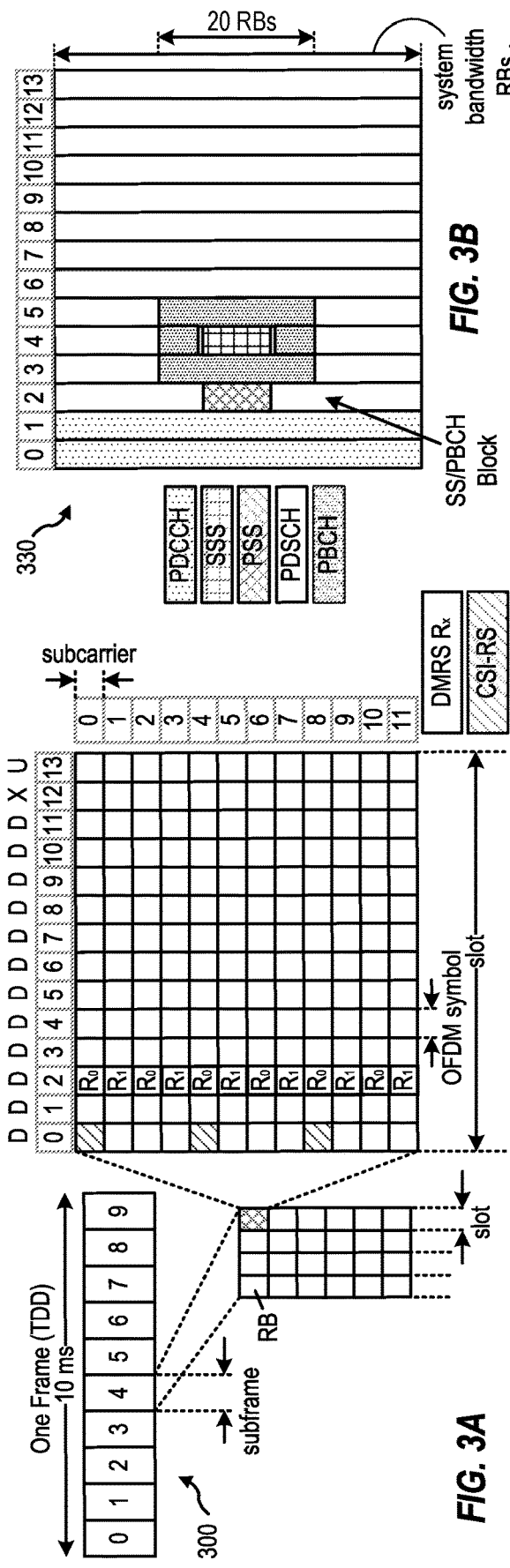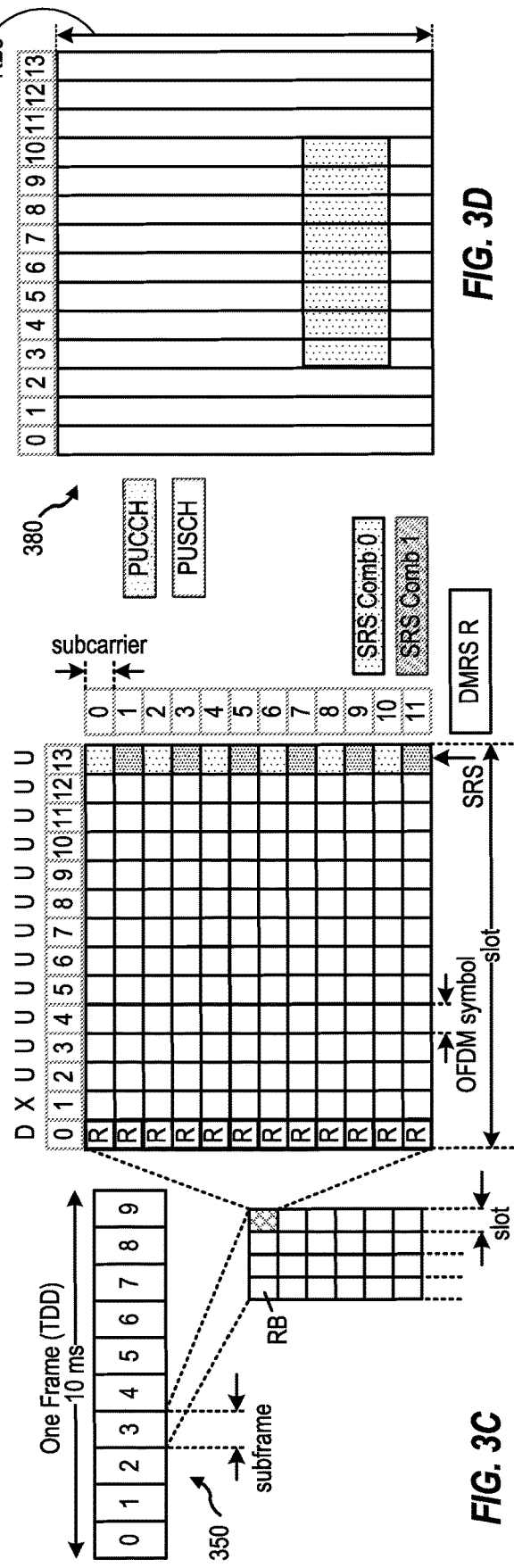

FACILITATING THE USE OF RANDOM ACCESS CHANNEL OCCASIONS FOR FULL-DUPLEX COMMUNICATION

INTRODUCTION

Aspects of the present disclosure relate to wireless communications, and more particularly, to techniques for facilitating the use of random access channel occasions for full-duplex communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, such challenges may include challenges related to selecting random access channel (RACH) occasions (ROs) for accessing the wireless communication systems. Consequently, there exists a need for further improvements in wireless communications systems to overcome various challenges.

SUMMARY

Certain aspects can be implemented in a method for wireless communication performed by a user equipment (UE) in a first group of UEs. The method may include receiving, from a base station (BS) of a wireless network, a first indication indicating, from a first plurality of random access channel occasions (ROs) not available for use by a second group of UEs within the wireless network, a set of ROs that are available for use by the first group of UEs within the wireless network, wherein the set of ROs that are available for use by the first group of UEs within the wireless network include ROs associated with full-duplex communication. The method also includes receiving a first signal of a plurality of signals transmitted by the BS and transmitting, in response to receiving the first signal, a random access preamble in a first RO of the set of ROs based on a mapping between the first signal and the first RO.

Certain aspects can be implemented in a method for wireless communication performed by a base station (BS)). The method may include transmitting, to a user equipment (UE) of a first group of UEs in a wireless network, a first indication indicating, from a first plurality of random access channel occasions (ROs) not available for use by a second group of UEs within the wireless network, a set of ROs that are available for use by the first group of UEs within the wireless network; transmitting a first signal of a plurality of signals to the UE, wherein the set of ROs that are available for use by the first group of UEs within the wireless network include ROs associated with full-duplex communication. The method also includes receiving, in response to receiving the first signal, a random access preamble in a first RO of the set of ROs based on a mapping between the first signal and the first RO Other aspects provide apparatuses configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and an apparatus comprising means for performing the aforementioned methods as well as those further described herein.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

Figure 1:
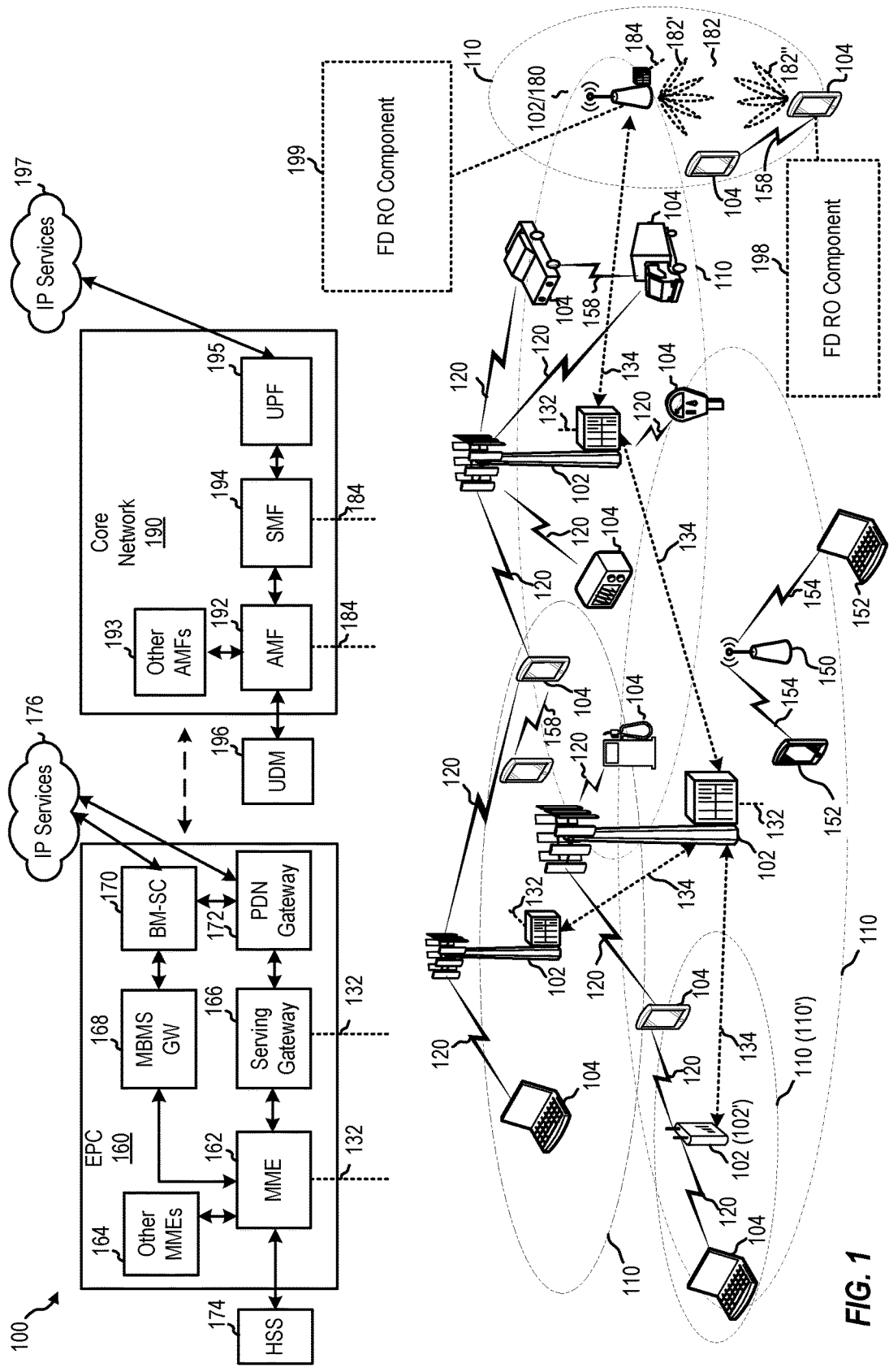
FIG. 1 is a block diagram conceptually illustrating an example wireless communication network.

The following description and the appended figures set forth certain features for purposes of illustration.

DETAILED DESCRIPTION

Aspects of the present disclosure provide apparatuses, methods, processing systems, and computer-readable mediums for indicating an overlap of downlink transmissions with one or more random access channel occasions. For example, user equipments (UEs) may perform random access channel (RACH) procedures for various reasons, such as establishing an initial connection with a network, updating a time advance (TA), performing a beam recovery procedure, and the like. To initiate a RACH procedure, a UE may transmit a RACH preamble within a RACH occasion (RO) on the uplink (UL). ROs are generally predefined periods in time in which UEs may transmit RACH preambles to a BS.

In current 5G new radio (NR) systems, ROs may be subject to certain legacy validation rules that indicate which ROs are valid for use by a UE and which ROs are invalid for use by the UE. For example, these legacy RO validation rules provide that a valid RO for use by a UE to transmit a RACH preamble cannot overlap with other downlink (DL) transmissions. Since only certain ROs may be considered valid, this may increase latency associated with performing RACH procedures. These ROs may be known as half-duplex (HD) ROs and may be the only type of RO that certain UEs, such as legacy UEs (e.g., UEs subject to the legacy RO validation rules), may utilize to access the network. However, to provide UEs with more flexibility and to help reduce latency associated with RACH procedures, certain other UEs, such as future non-legacy UEs (e.g., UEs not subject to the legacy RO validation rules), may use ROs that do overlap with other downlink transmissions. These types of ROs may be known as full-duplex (FD) ROs and may include ROs that are considered invalid under the legacy validation rules.

In order to transmit a RACH preamble, a UE may first monitor for and measure certain signals from a base station, such as synchronization signal blocks (SSBs) and/or channel state information reference signals (CSI-RSs). In current systems, these SSBs/CSI-RSs may be sequentially mapped to valid ROs (e.g., ROs that do not overlap with other DL transmissions). This mapping is important as it provides an indication of the beams that should be used by the base station to communicate with the UE. For example, because in legacy systems SSBs are sequentially mapped to valid ROs, a base station is able to determine the SSB and associated beam to use based on which valid RO a RACH preamble is transmitted in by the UE.

However, challenges/issues may arise with the sequential SSB-to-RO mapping when traditionally invalid ROs (e.g., ROs that are invalid under the legacy validation rules) are used by FD-capable UEs to transmit a RACH preamble. For example, because such traditionally-invalid ROs are ignored and not included when sequentially mapping SSBs to valid ROs, it is not clear how to map a SSBs to these traditionally invalid ROs. As such, if an FD UE were to transmit a RACH preamble within one of these traditionally invalid ROs, the BS may have difficulty determining the SSB corresponding to the traditionally invalid RO, which may cause the BS to incorrectly determine the beam for communicating with the UE. Using an improper beam to communicate with the UE may result in missed communications between the base station and non-legacy UE and, in turn, these missed communications may lead to increased latency in the non-legacy UE accessing the base station as well as wasted time and frequency resources within a wireless network and wasted power resources at the base station and UE associated with retransmissions for the missed communications.

Accordingly, aspects of the present disclosure provide techniques for facilitating the use of ROs, invalidated under legacy validation rules, with FD-capable base stations and UEs. In some cases, such techniques may involve indicating, from a first plurality of ROs not available for use by one group of UEs (e.g., legacy UEs), a set of ROs that are available for use by another group of UEs (e.g., non-legacy UEs). Additionally, these techniques may further include indicating a mapping between SSBs or other reference signals (e.g., channel state information reference signals (CSI-RSs)) and corresponding ROs that may be used when transmitting/receiving RACH preambles.

The techniques presented herein may help to facilitate the use of ROs with both legacy UEs and non-legacy UEs, ensuring that RACH preambles, corresponding to SSBs/CSI-RSs, are transmitted within the proper ROs. Helping to ensure RACH preambles are transmitted within the proper ROs may avoid situations in which the base station determines and improper beam for communicating with a particular UE and, thereby, reduces wasted time and frequency resources within the wireless network and wasted power resources at the bases station and UE.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO)

antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 2:
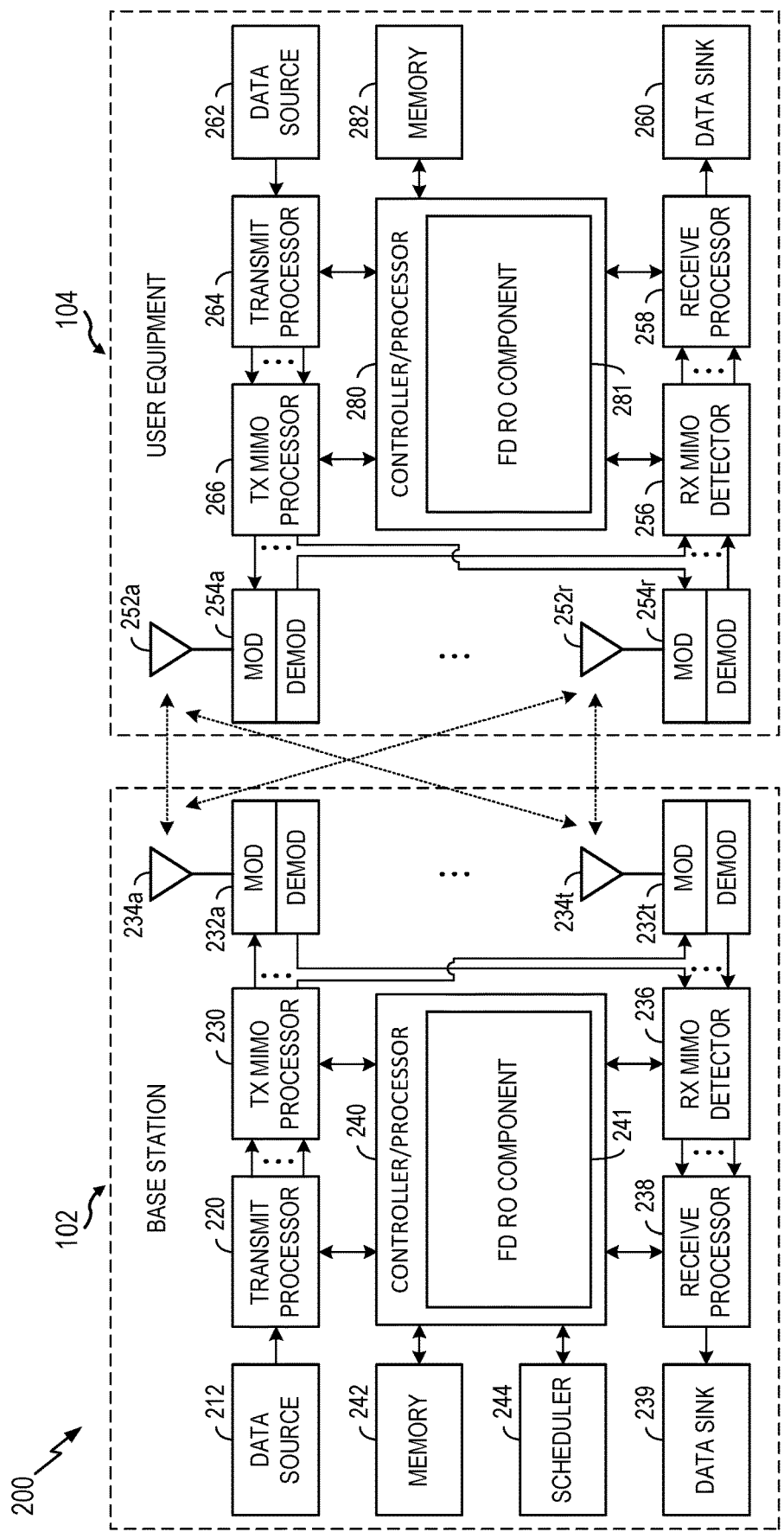
FIG. 2 is a block diagram conceptually illustrating aspects of an example base station and user equipment.
Figure 5:
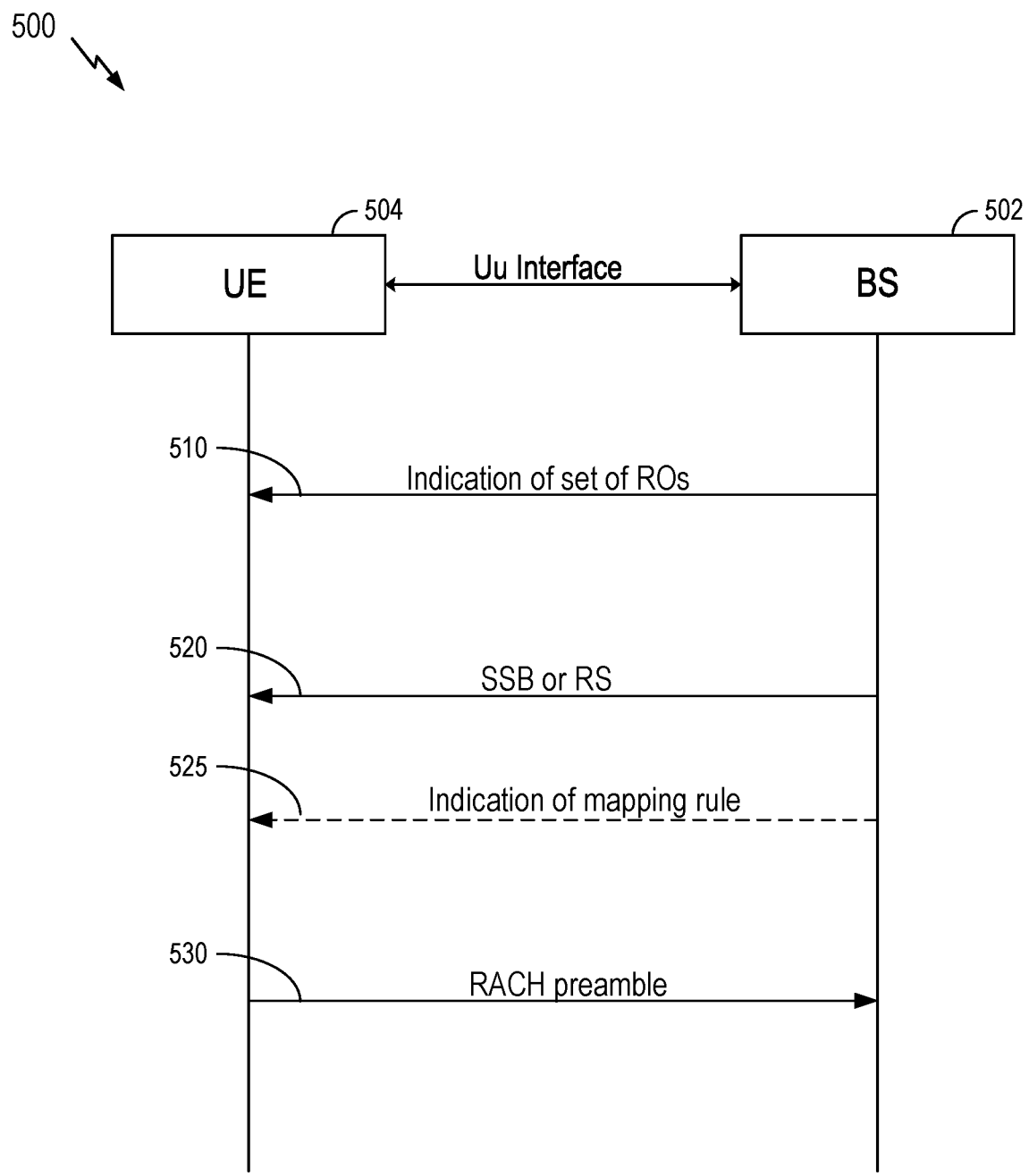
FIG. 5 is an example call flow diagram illustrating example operations for wireless communication between a user equipment and a base station.
Figure 6:
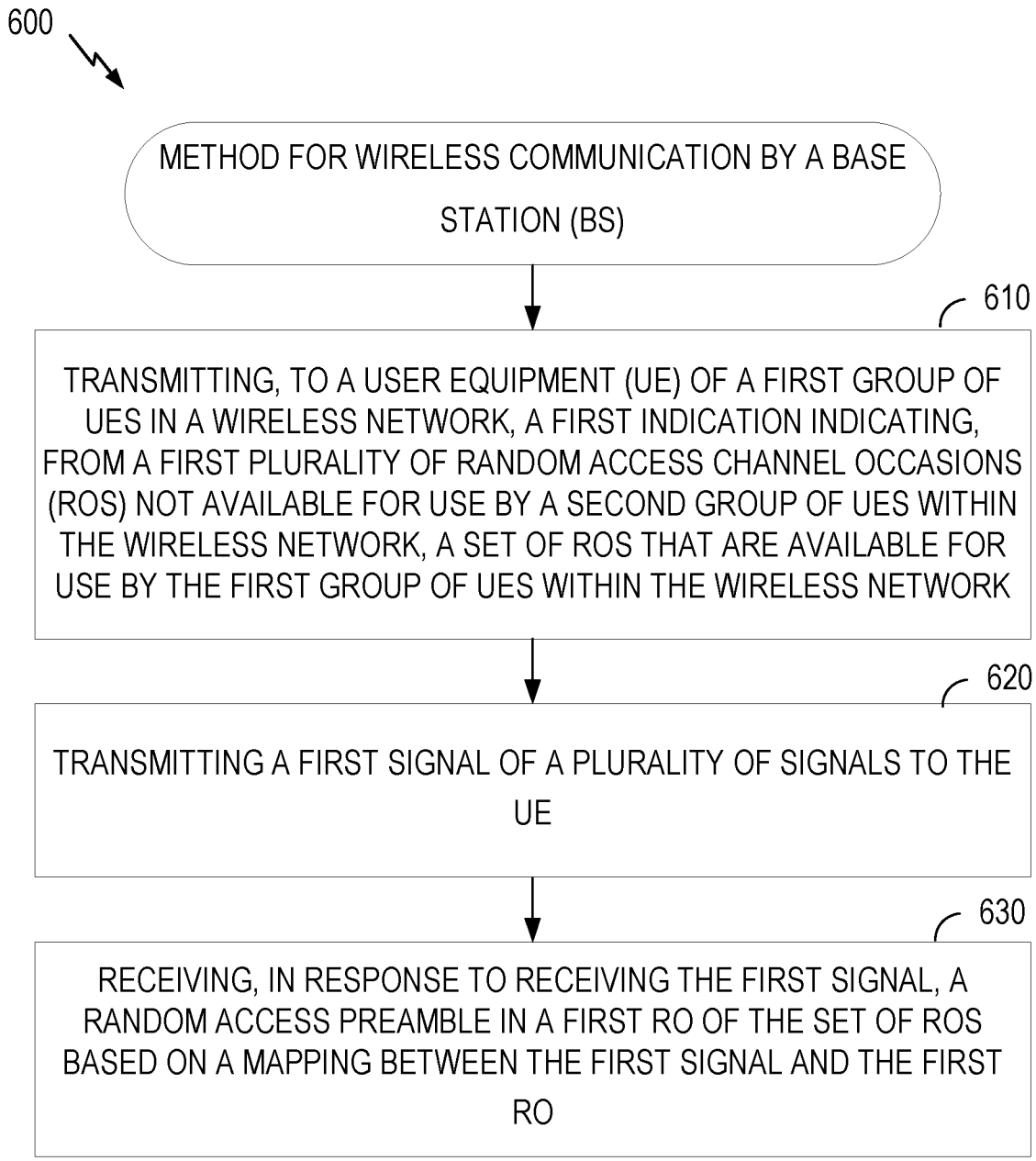
FIG. 6 is a flow diagram illustrating example operations for wireless communication by a base station.

Wireless communication network 100 includes full duplex (FD) random access channel occasion (RO) component 199, which may be configured to perform the operations shown in FIGS. 5 and 6, as well as other operations described herein for facilitating the use of random access channel occasions for full-duplex communication. Wireless communication network 100 further includes FD RO component 198, which may be used configured to perform the operations shown in FIGS. 5 and 7, as well as other operations described herein for facilitating the use of random access channel occasions for full-duplex communication FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes FD RO component 241, which may be representative of FD RO component 199 of FIG. 1. Notably, while depicted as an aspect of controller/processor 240, FD RO component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes FD RO component 281, which may be representative of FD RO component 198 of FIG. 1. Notably, while depicted as an aspect of controller/processor 280, FD RO component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Introduction to Multi Antenna Panel Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 4A:
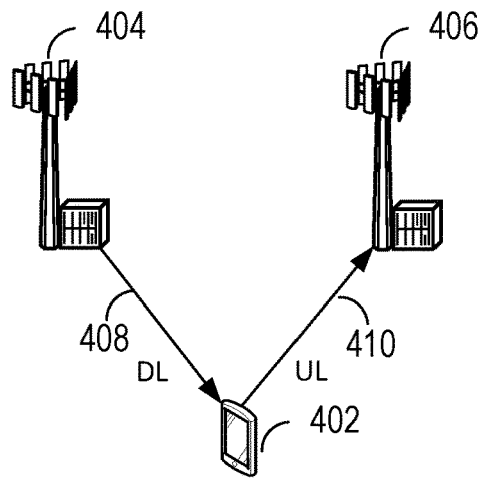
FIGS. 4A-4C illustrates different full-duplex use cases within a wireless communication network.
Figure 4B:
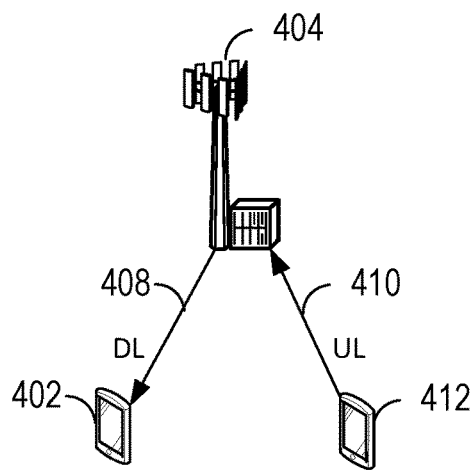
Figure 4C:
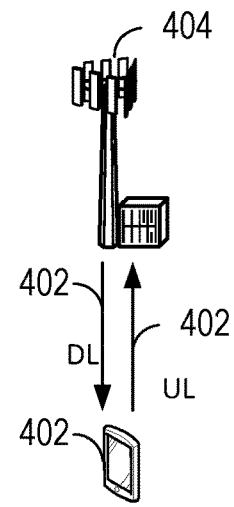

FIGS. 4A-4C illustrates different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 may simultaneously receive DL transmissions 408 from the BS 406 and transmit UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 may receive DL transmissions 408 from the BS 404 while another UE 412 may simultaneously transmit UL transmission 410 to the BS 404. Thus, in this example, BS 404 is conducting simultaneous uplink and downlink communications.

A third FD use case is illustrated in FIG. 4C involving one BS and one UE. As illustrated, the UE 402 may receive DL transmissions 408 from the BS 404 and may simultaneously transmit UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 4A) for mTRP |
| FD enabled | FD disabled | Use case #2 (FIG. 4B) + R-16 IAB |
| FD enabled | FD enabled | Use case #3 (FIG. 4C) |

As shown, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 4A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Aspects Related to Facilitating the Use of Random Access Channel Occasions for Full-Duplex In current 5G NR communication systems, UEs use a HD mode exclusively for performing random access channel (RACH) procedures with a BS. Generally, RACH procedures may be used by the UE for one or more purposes, such as establishing an initial connection with a network, updating a time advance (TA) in connected mode, performing a beam recovery procedure in connected mode, and the like.

To begin a RACH procedure, the UE may select a RACH occasion (RO) in which to transmit a RACH preamble to the BS. A RACH occasion is an area specified in a time domain and a frequency domain that are available for the transmission of the RACH preamble. In response to the RACH preamble, the UE may receive a random access response (RAR) from the network. The RAR may indicate which preamble it is related to, a TA that should be used by the UE, a scheduling grant for sending Message 3, and a temporary cell radio network temporary identifier (TC-RNTI). Thereafter, the UE may transmit and receive additional messages (e.g., Message 3 and Message 4, respectively) to resolve any collision between two or more UEs attempting to access the network with the same preamble in the same physical PRACH resource. Once the random access (RA) procedure is completed, UE moves to connected state.

In some cases, time and frequency resources of ROs are subjected to certain validation rules, which may be used to determine whether a particular RO is valid or invalid. Generally, under such validation rule, a valid RO cannot overlap with other DL transmissions, such as synchronization signal block (SSBs), physical downlink control channel (PDCCH) transmissions, physical downlink shared channel (PDSCH) transmissions, and channel state information reference signals (CSI-RS). In other words, when transmitting a RACH preamble within an RO in current 5G NR systems, this RO must be free of other DL transmissions.

More specifically, the validation rules depend on a time division duplex (TDD) configuration (if provided) and a temporal distance between ROs and SSBs. For example, for an unpaired spectrum, if a UE is not provided the parameter tdd-UL-DL-ConfigurationCommon, a RO in a PRACH slot is valid if it does not precede a SSB in the PRACH slot and starts at least $N_{gap}$ symbols after a last SSB reception symbol and, if channelAccessMode=semistatic is provided, does not overlap with a set of consecutive symbols before the start of a next channel occupancy time where the UE does not transmit. The parameter $N_{gap}$ is provided in Table 8.1-2 of 3rd Generation Partnership Project (3GPP) technical specification (TS) 38.213. In this case, a candidate SSB index of the SSB for the RO corresponds to the SSB index provided by the parameter ssb-PositionsInBurst in system information block 1 (SIB1) or in serving cell configuration information (e.g., ServingCellConfigCommon).

In other cases, if the UE is provided the parameter tdd-UL-DL-ConfigurationCommon, an RO in a PRACH slot is valid if the RO is within UL symbols, or the RO does not precede an SSB in the PRACH slot and starts at least $N_{gap}$ symbols after a last downlink symbol and at least $N_{gap}$ symbols after a last SSB symbol, and, if channelAccessMode=semistatic is provided, does not overlap with a set of consecutive symbols before the start of a next channel occupancy time where there shall not be any transmissions. As noted above, the parameter $N_{gap}$ is provided in Table 8.1-2 of 3GPP TS 38.213. Similarly, in this case, a candidate SSB index of the SSB for the RO corresponds to the SSB index provided by the parameter ssb-PositionsInBurst in system information block 1 (SIB1) or in serving cell configuration information (e.g., ServingCellConfigCommon).

As described above, there is a configured mapping between SSBs and valid ROs. This mapping is important as it may be used by a UE to determine which RO should be selected by a UE to send a RACH preamble based on measurements of a particular SSB. For example, when determining which RO to select to transmit a RACH preamble, the UE performs measurements on one or more SSBs. Thereafter, the UE may select a particular RO based on a mapping between the measured one or more SSBs and the particular RO (as well as the validation ruled described above).

As noted above, in current 5G NR systems, an HD mode is used exclusively for RACH procedures. However, there may be instances in which a base station supports FD and can perform simultaneous downlink (DL) transmission (TX) and uplink (UL) reception (RX) with UEs. In some cases, it may be possible for a FD base station to support full-duplex UL RX of RACH preambles in ROs with DL TX of other signals, such as such as SSBs or other DL reference signals or channels. While support for FD UL RX of preambles with DL TX of other signals may be possible, the FD base station may still want to serve legacy UEs (e.g., UEs that are subject to the legacy RO validation rules). In such cases, these legacy UEs will still apply the above validation rules to first determine valid ROs and then map SSBs to the valid ROs.

However, challenges/issues may exist in the scenario where a subset of ROs are invalidated based on the legacy RO validation rules when, in fact, the FD base station and non-legacy UEs are able to support RACH preamble transmission on the subset of invalidated ROs. Such challenges/issues may relate to the manner in which non-legacy UEs map SSBs to ROs when certain ROs are invalid under legacy RO validation rules. For example in a legacy system, SSBs may be sequentially mapped to valid ROs. For example, assume there are three ROs, such as RO #1, RO #2, and RO #3, and that there are three SSBs, such as SSB #1, SSB #2, and SSB #3. Further, assume that RO #1 and RO #3 are valid ROs while RO #2 is invalid. In this case, SSB #1 may be mapped to RO #1 while, since RO #2 is invalid, SSB #2 may be mapped to RO #3 and SSB #3 may be mapped to a subsequent RO.

However, when certain ROs are invalidated under the legacy RO validation rules for legacy UEs but are available for use by other non-legacy UEs, it is not clear which RO a particular SSB should be mapped to. For example, in the example above, it may be the case that RO #2 is invalid under the legacy RO validation rules and not available for use by legacy UEs but is valid and available for use by non-legacy UEs. In such cases, it is not clear whether SSB #2 should still be mapped to RO #3 like in the legacy case or whether SSB #2 should instead be mapped to RO #2 since RO #2 is valid for non-legacy UEs. In the latter case, then SSB #3 may be mapped to RO #3.

The mapping between SSBs and ROs is important as this mapping is associated with the beams that should be used by the base station as well as the UE. For example, because in legacy systems SSBs are sequentially mapped to valid ROs, a base station is able to determine the SSB and associated beam to use based on which RO a preamble is received in. For example, if the base station were to receive a RACH preamble in RO #3 from a legacy UE, the base station may determine that this RACH preamble corresponds to SSB #2. The base station may then determine the beam corresponding to SSB #2 and may use this beam when communicating with the UE. However, if a non-legacy UE assumes RO #2 is still valid and corresponds to SSB #2 and, hence RO #3 corresponds to the next SSB (e.g., SSB #3), an error may occur at the base station side in determining the beam to use for communicating with the non-legacy UE. For example, a non-legacy UE may transmit a RACH preamble in RO #3 corresponding to SSB #3, while the base station may be expecting SSB #2 to be mapped to RO #3. This can lead to the base station selecting an improper beam for communicating with the non-legacy UE, resulting in missed communications between the base station and non-legacy UE. In turn, these missed communications may lead to increased latency in the non-legacy UE accessing the base station as well as wasted time and frequency resources within a wireless network and wasted power resources at the base station and UE associated with retransmissions for the missed communications.

Accordingly, aspects of the present disclosure provide techniques for facilitating the use of ROs, invalidated under legacy HD RO validation rules, with FD-capable base stations and user equipments. In some cases, such techniques may involve indicating, from a first plurality of ROs not available for use by one group of UEs (e.g., legacy UEs), a set of ROs that are available for use by another group of UEs (e.g., non-legacy UEs). Additionally, these techniques may further include indicating a mapping between SSBs or other reference signals (e.g., channel state information reference signals (CSI-RSs)) and corresponding ROs that may be used when transmitting/receiving RACH preambles.

The techniques presented herein may help to facilitate the use of ROs with both legacy UEs and non-legacy UEs, ensuring that RACH preambles, corresponding to SSBs/CSI-RSs, are transmitted within the proper ROs. Helping to ensure RACH preambles are transmitted within the proper ROs may avoid situations in which the base station determines and improper beam for communicating with a particular UE and, thereby, reduces wasted time and frequency resources within the wireless network and wasted power resources at the bases station and UE.

Example Call Flow Illustrating Operations for Facilitating the Use of Random Access Channel Occasions for Full-Duplex FIG. 5 is a call flow diagram illustrating example operations 500 between a BS 502 and a UE 504 for facilitating the use of random access channel occasions with full-duplex-capable base stations and user equipments. In some cases, the BS 502 may be an example of the BS 102 illustrated in FIGS. 1 and 2. Additionally, the UE 504 may be an example of the UE 104 illustrated in FIGS. 1 and 2. Further, as shown, a Uu interface may be established to facilitate communication between the BS 502 and UE 504, however, in other aspects, a different type of interface may be used.

As shown, operations 500 begin with the UE 504 receiving, from the BS 502 of a wireless network, a first indication indicating, from a first plurality of ROs not available for use by a second group of UEs within the wireless network, a set of ROs that are available for use by a first group of UEs, including the UE 504, within the wireless network. In some cases, the set of ROs that are available for use by the first group of UEs within the wireless network include ROs associated with full-duplex communication.

In some cases, the second group of UEs may include legacy UEs that are subject to the legacy RO validation rules described above while the first group of UEs may include non-legacy UEs that are not subject to these legacy RO validation rules. Accordingly, in such cases, the first plurality of ROs that are not available for use by the second group of UEs may include ROs that are invalidated under these legacy RO validation rules due to overlapping downlink transmissions, etc. Further, the set of ROs that are available for use by the first group of UEs may include ROs that, while invalidated for use by the second group of UEs under the legacy RO validation rules, are valid for use by non-legacy UEs. Thus, in other words, the first indication may be used to indicate to the UE 504 whether some/all of ROs, invalidated by the legacy RO validation rules, may still be used by the UE 504 for RACH preamble transmission.

The first indication may be provided in different manners. For example, in some cases, the first indication indicating the set of ROs may comprise an implicit indication based on information indicating that the BS 502 supports FD communication. In other cases, the first indication indicating the set of ROs may comprise an explicit indication received from the BS 502. For example, in some cases, the explicit indication may be received in at least one of a system information block (SIB) (e.g., SIB1 or other SIBs) or radio resource control (RRC) signaling.

In some cases, the set of ROs may include different sets of ROs from the plurality of ROs that are not available for use by the second group of UEs. For example, in some cases, the set of ROs comprise all ROs in the first plurality of ROs that are not available for use by the second group of UEs. In other cases, the set of ROs may comprise a subset of the first plurality of ROs that are not available for use by the second group of UEs.

In some cases, the ROs included within the set/subset of ROs or rules for determining these ROs may be explicitly indicated in the first indication (e.g., the first indication explicitly indicates the ROs included within the set of ROs) or may be preconfigured in memory of the UE 504 (e.g., by a manufacturer of the UE 504, by an operator of the wireless network, etc.).

In some cases, the ROs that may be included within the set of ROs (e.g., the subset) may be based on a time division duplex (TDD) configuration. For example, in some cases, the set of ROs comprise ROs from the first plurality of ROs not available for use by the second group of UEs (e.g., ROs that are invalid under the legacy RO validation rules) that are located within flexible resources included in the TDD configuration. In some cases, the set of ROs comprise ROs from the first plurality of ROs not available for use by the second group of UEs (e.g., ROs that are invalid under the legacy RO validation rules) are located within full duplex resources included within the TDD configuration.

In some cases, the ROs that may be included within the set of ROs (e.g., the subset) may be based on locations of SSBs transmitted by the BS 502. For example, in some cases, the set of ROs may include ROs from the first plurality of ROs not available for use by the second group of UEs that do not collide with SSBs transmitted by the BS 502. In such cases, the set of ROs comprise ROs from the first plurality of ROs not available for use by the second group of UEs that, for example, do not precede a location of an SSB transmitted by the BS 502 in a PRACH slot. In some cases, the set of ROs comprise ROs from the first plurality of ROs not available for use by the second group of UEs that start after a threshold number of symbols (e.g., $N_{gap}$) after a last symbol location of an SSB transmitted by the BS 502 in a PRACH slot.

In other cases, the set of ROs may include ROs from the first plurality of ROs not available for use by the second group of UEs that overlap with SSBs transmitted by the BS 502.

In some cases, the ROs included within the set/subset of ROs or rules for determining these ROs may be explicitly indicated in the first indication using a bitmap. For example, in some cases, the bitmap may include a plurality of bits. In such cases, each bit of the plurality of bits may correspond to a different RO of the first plurality of ROs not available for use by the second group of UEs and may indicate whether that corresponding different RO is available for use by the first group of UEs. For example, in some cases, a first bit in the bitmap may correspond to a first RO index of the first plurality of ROs while a second bit in the bitmap may correspond to a second RO index of the first plurality of ROs. In such cases, a value of the first bit may be set to indicate whether the first RO corresponding to the first RO index is included within the set of ROs available for use by the first group of UEs. For example, a value of "1" may indicate that the first RO is available for use by the first group of UEs while a "0" may indicate that the first RO is not available for use by the first group of UEs or vice versa. Likewise, a value of the second bit in the bitmap may be set to indicate whether the second RO corresponding to the second RO index is included within the set of ROs available for use by the first group of UEs, and so on.

In some cases, the bitmap may be a bitmap of SSB indices that precede or follow one or more of the ROs initially included in the first plurality of ROs not available for use by the second group of UEs (e.g., legacy UEs) but that are now available for use by the first group of UEs (e.g., non-legacy UEs). For example, in some cases, the bitmap includes a plurality of bits and each bit of the plurality of bits corresponds to and indicates a different SSB index of a plurality of SSBs to be transmitted by the BS 502. Further, each indicated different SSB index in the bitmap may indicate a corresponding RO included within the set of ROs.

For example, in some cases, the bitmap may include a first bit that corresponds to a first SSB index of a first SSB of the plurality of SSBs to be transmitted by the BS 502. Additionally, in some cases, the bitmap may include a second bit that corresponds to a second SSB index of a second SSB of the plurality of SSBs to be transmitted by the BS 502. In some cases, the first SSB may correspond to a first RO of the first plurality of ROs and may precede or follow the first RO in time. Likewise, the second SSB may correspond to a second RO of the first plurality of ROs and may precede or follow the second RO in time. Accordingly, in some cases, a value of the first bit and the second bit may be set to indicate whether the first SSB index and/or the second SSB index, respectively, are included within the bitmap or not. For example, the first bit may be set to a value of "1" (or "0" depending on implementation) to indicate that the first SSB index is included in the bitmap while the second bit may be set to a value of "0" (or "1" depending on implementation) to indicate that the second SSB index is not included in the bitmap. In such cases, the UE 504 may use the indicated SSB indices in the bitmap to determine which SSBs and corresponding ROs are available for use by the first group of UEs including the UE 504.

Based on the first indication received at 510 of FIG. 5, some "extra" ROs (e.g., which were initially deemed invalid under the legacy RO validation rules) will still be assumed to be valid or available for use by the first group of UEs. Thereafter, the question becomes how to map SSBs to these extra ROs. If the BS 502 does not intend to serve the second group of UEs (e.g., legacy UEs), then all ROs may be assumed to be valid, and a sequential mapping can be assumed for mapping SSBs to all the valid ROs.

However, if the BS 502 still serves the second group of UEs (e.g., legacy UEs), those UEs may assume a sequential mapping from SSBs to valid ROs (e.g., ROs that "survive" the legacy RO validation rules). In such cases, the first group of UEs (e.g., non-legacy UEs) may also need to adhere to the same mapping of SSBs to ROs that are valid under the legacy RO validation rules. As such, in some cases, the UE 504 may further be provided an indication of a mapping rule to map SSBs to the extra ROs available for use by the first group of UEs, as will be explained in greater detail below.

After receiving the first indication of the set of ROs available for use by the first group of UEs, the UE 504 receives at 520 a first signal of a plurality of signals transmitted by the BS 502. In some cases, the first signal may comprise a first SSB of a plurality of SSBs or may include a first CSI-RS of a plurality of CSI-RSs. Thereafter, at 530 the UE 504 transmits, in response to receiving the first signal at 520, a random access preamble in a first RO of the set of ROs based on a mapping between the first signal and the first RO.

In some cases, prior to transmitting the random access preamble, the UE 504 may receive at 525 in FIG. 5 a second indication from the BS 502. The second indication may indicate a mapping rule that may be used by the UE 504 to determine the mapping between the first signal and the first RO in which to transmit the random access preamble. In some cases, rather than being received from the BS 502, the mapping rule may be preconfigured in memory of the UE 504, such as by a manufacturer of the UE 504, by an operator of the wireless network, etc.

For example, in some cases (e.g., when the BS 502 does not intend to support the second group of UEs/legacy UEs), the second indication may indicate indicates that the set of ROs includes all ROs of the first plurality of ROs not available for use by the second group of UEs. In such cases, the second indication may also indicate that the mapping between the first SSB and the first RO is based on a legacy mapping rule in which SSBs are sequentially mapped to ROs.

In some cases, the second indication indicating the mapping rule may be an explicit indication received in at least one of a SIB (e.g., SIB1) or in RRC signaling. In other cases, the second indication indicating the mapping rule comprises an implicit indication based on access control information received from the BS 502 indicating that the second group of UEs are barred from accessing the BS. For example, when the UE 504 receives the access barring information indicating that the second group of UEs are barred from accessing the BS 502, the UE 504 may assume that all ROs are available for use by the first group of UEs and that SSBs are sequentially mapped to ROs. Based on this mapping, the UE 504 may determine that the first SSB maps to the first RO and may transmit the random access preamble at 530 accordingly In some cases, the mapping rule may indicate that a same SSB index that is mapped to a legacy valid RO (e.g., an RO that is valid under the legacy RO validation rules) and that is preceding and/or following an "extra" RO (e.g., an RO assumed to be valid by a non-legacy FD UE but invalid under the legacy RO validation rules), is mapped to the extra RO.

Accordingly, for example, in this case, the mapping rule received by the UE 504 or preconfigured in the UE 504 may indicate that an SSB index that maps to a second RO, not included in the set of ROs received at 510 by the UE 504, preceding or following the first RO (e.g., in which the UE 504 transmits the random access preamble) also maps to the first RO. In other words, for example, an SSB index of the first SSB received at 520 by the UE 504 may map to the second RO not included in the set of ROs and also to the first RO, via the mapping rule, in which the UE 504 transmits the random access preamble.

In some cases, the mapping rule may indicate that for an RO that overlaps with SSB (and this RO is indicated as invalid under the legacy RO validation rules but is indicated as valid for use by non-legacy UEs, such as the UE 504), this RO may be assumed (or indicated) to be mapped to the same SSB. In other words, the mapping rule may indicate that an RO of the set of ROs that overlaps with an SSB of the plurality of SSBs maps to the overlapped SSB. In such cases, the first RO in which the UE 504 transmits the random access preamble comprises the RO that that overlaps with an SSB of the plurality of SSBs and the first SSB comprises the overlapped SSB.

In some cases, the mapping rule may indicate that there is a sequential mapping of SSBs to the "extra" ROs available for use by the first group of UEs like as in legacy cases. To determine the sequential mapping, the UE 504 may first sequentially map ROs that are valid under the legacy RO validation rules (e.g., and available for use by the second group of UEs as well as the first group of UEs). The UE 504 may then ignore the legacy-valid ROs and repeat the sequential mapping for the "extra" ROs available for use by the first group of UEs but not available by use by the second group of UEs.

More specifically, for example, the mapping rule may indicate that SSBs of the plurality of SSBs are to be first sequentially mapped to ROs of a second plurality of ROs available for use by the second group of UEs, ignoring ROs in the set of ROs from the first plurality of ROs not available for use by the second group of UEs. Thereafter, the mapping rule may indicate that remaining SSBs of the plurality of SSBs not mapped to ROs of the second plurality of ROs are to be sequentially mapped to ROs of the set of ROs from the first plurality of ROs not available for use by the second group of UEs. In some cases, the UE 504 may receive from the BS 502 an indication of a starting SSB index to start mapping the remaining SSBs (e.g., the SSBs not available for use by the second group of UEs but available for use by the first group of UEs). In other words, the UE 504 may map the sequentially map the remaining SSBs of the plurality of SSBs starting at the indicated starting SSB index.

In some cases, the UE 504 may map the remaining SSBs based on a bitmap. For example, as noted above, in some cases, the mapping rule indicates that SSBs of the plurality of SSBs are to be first sequentially mapped to ROs of a second plurality of ROs available for use by the second group of UEs, ignoring ROs in the set of ROs from the first plurality of ROs not available for use by the second group of UEs. Thereafter, the mapping rule indicates that remaining SSBs of the plurality of SSBs not mapped to ROs of the second plurality of ROs are to be sequentially mapped to ROs of the set of ROs from the first plurality of ROs not available for use by the second group of UEs according to a bitmap. In such cases, the bitmap may indicate the remaining SSBs to be sequentially mapped to the set of ROs from the first plurality of ROs not available for use by the second group of UEs As noted above, in some cases, the first signal received at 520 by the UE 504 may comprise a CSI-RS of a plurality of CSI-RSs. Further, in some cases, the mapping rule may indicate CSI-RSs of the plurality of CSI-RSs to be mapped to the set of ROs from the first plurality of ROs not available for use by the second group of UEs.

In some cases, the UE 504 may receive, from the BS 502, one or more parameters associated with transmitting the random access preamble at 530. In some cases, the one or more parameters comprise a number of SSB indices associated with one RO. In some cases, the one or more parameters may include a number of contention-based random access preambles per SSB index per RO included in the set of ROs. In some cases, the UE 504 may use these parameters to determine the mapping between the first SSB and first RO in order to transmit the random access preamble at 530.

In some cases, when transmitting a random access preamble in the first RO, the random access preamble transmission may experience interference (e.g., self-interference from the UE 504 and/or crosslink interference from other UEs) since the first RO may overlap with other downlink signals. In such cases, the BS 502 may provide the UE 504 with one or more power related parameters that the UE 504 may use to help manage this interference. In some cases, the power related parameters may include, for example, at least one of a reference signal received power (RSRP) threshold for the plurality of signals transmitted by the BS 502, a target receive power for the plurality of signals transmitted by the BS 502, a power ramping step associated with the plurality of signals transmitted by the BS 502, or a number of retransmissions associated with the plurality of signals transmitted by the BS 502. In some cases, the UE 504 may also receive an uplink time advance offset for the set of ROs.

In some cases, there may be two sets of ROs available for use by the UE 504, such as a first set including ROs assumed to be valid under the legacy RO validation rules and a second set of ROs (e.g., the set of ROs indicated to the UE 504 at 510 in FIG. 5) including "extra" ROs validated for use by only non-legacy UEs. In such cases, if the UE 504 were to need to retransmit a random access preamble, the UE 504 may, for the retransmission, select an RO from a different set than the set used for transmitting an original transmission of the random access preamble.

For example, as noted above, the UE 504 may transmit at 530 the random access preamble in the first RO. In some cases, however, the UE 504 may thereafter determine that the random access preamble needs to be retransmitted in a second RO. Thereafter, the UE 504 may increment a number of transmissions accordingly to determine a transmission power to be used for the retransmission and/or whether the UE 504 can still perform the retransmission (e.g., due to certain power/emission regulations). When the UE 504 determines that it may proceed with the retransmission, the UE may select the second RO from a second plurality of ROs that are available for use by the second group of UEs. The UE may then retransmit the random access preamble in the selected second RO.

In some cases, to balance the load in the wireless network, it may be advantageous to restrict the use of certain types of ROs by certain types of UEs. For example, in some cases, the second group of UEs (e.g., legacy UEs) may be restricted to using only ROs valid under the legacy RO validation rules while the first group of UEs (e.g., non-legacy UEs) may be restricted to only using ROs in the set of ROs indicated at 510 (e.g., the "extra" ROs that are capable of being used by non-legacy UEs). In such cases, the UE 504 may receive an indication from the BS 502 indicating that the UE 504 must use ROs in the set of ROs from the first plurality of ROs not available for use by the second group of UEs when transmitting the random access preamble at 530. This indication may further indicate to the UE 504 that the UE 504 may not use ROs from a second plurality of ROs available for use by the second group of UEs.

It should be noted that, while the techniques presented above are described in relation to a UE of a first group of UEs receiving an indication of a set of ROs that are available for use by the first group of UEs (e.g., but not available for use by a second group of UEs) and using one of the ROs indicated in the set of ROs to transmit a random access preamble, these techniques may apply equally to other types of wireless devices, such as integrated access and backhaul (IAB) nodes and/or a combination of IAB nodes and UEs. In other words, in some cases, the UE 504 described above may instead by another type of wireless device, such as an IAB node.

Example Method for Facilitating the Use of Random Access Channel Occasions for Full-Duplex FIG. 6 is a flow diagram illustrating example operations 600 for wireless communication. The operations 600 may be performed, for example, by a BS (e.g., such as the BS 102 in the wireless communication network 100 of FIG. 1) for facilitating the use of random access channel occasions for full-duplex. The operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 begin, at 610, with transmitting, to a user equipment of a first group of UEs in a wireless network, a first indication indicating, from a first plurality of random access channel occasions (ROs) not available for use by a second group of UEs within the wireless network, a set of ROs that are available for use by the first group of UEs within the wireless network. In some cases, the set of ROs that are available for use by the first group of UEs within the wireless network include ROs associated with full-duplex communication.

In block 620, the BS transmits a first signal of a plurality of signals to the UE.

In block 630, the BS receives, in response to transmitting the first signal, a random access preamble in a first RO of the set of ROs based on a mapping between the first signal and the first RO.

In some cases, the first indication indicating the set of ROs comprises an implicit indication based on information indicating that the BS supports full duplex communication.

In some cases, the first indication indicating the set of ROs comprises an explicit indication received in at least one of a system information block (SIB) or radio resource control (RRC) signaling.

In some cases, the set of ROs comprise all ROs in the first plurality of ROs not available for use by the second group of UEs.

In some cases, the set of ROs is based on a time division duplex (TDD) configuration. Additionally, in some cases, the set of ROs comprise ROs from the first plurality of ROs not available for use by the second group of UEs that: are located within flexible resources included in the TDD configuration or are located within full duplex resources included in the TDD configuration.

In some cases, the set of ROs is based on locations of SSBs transmitted by the BS. Additionally, in some cases, the set of ROs comprise ROs from the first plurality of ROs not available for use by the second group of UEs that, at least one of: do not precede a location of an SSB transmitted by the BS in a slot, or start after a threshold number of symbols after a last symbol location of an SSB in a slot.

In some cases, the first indication indicating the set of ROs comprises a bitmap, the bitmap including a plurality of bits, each bit of the plurality of bits corresponding to a different RO of the first plurality of ROs not available for use by the second group of UEs and indicating whether that corresponding different RO is available for use by the first group of UEs.

In some cases, the first signal comprises a first synchronization signal block (SSB) and the plurality of signals comprises a plurality of SSBs. Additionally, in some cases, the first indication indicating the set of ROs comprises a bitmap. Additionally, in some cases, the bitmap includes a plurality of bits. Additionally, in some cases, each bit of the plurality of bits corresponds to and indicates a different SSB index of the plurality of SSBs. Additionally, in some cases, each indicated different SSB index indicates a corresponding RO included within the set of ROs.

In some cases, the first signal comprises a first synchronization signal block (SSB). Additionally, in some cases, operations 600 may further include transmitting a second indication indicating that the set of ROs includes all ROs of the first plurality of ROs not available for use by the second group of UEs and that the mapping between the first SSB and the first RO is based on a legacy mapping rule in which SSBs are sequentially mapped to ROs.

In some cases, the second indication comprises an explicit indication received in at least one of a system information block (SIB) or in radio resource control (RRC) signaling.

In some cases, the second indication comprises an implicit indication based on access control information indicating that the second group of UEs are barred from accessing the BS.

In some cases, the mapping between the first signal and the first RO is based on a mapping rule.

In some cases, operations 600 further include transmitting the mapping rule in a system information block (SIB) or in radio resource control (RRC) signaling.

In some cases, the first signal comprises a first synchronization signal block (SSB). Additionally, in some cases, the mapping rule indicates that an SSB index that maps to a second RO, not included in the set of ROs, preceding or following the first RO also maps to the first RO. Additionally, in some cases, the first SSB corresponds to SSB index that maps to the second RO not included in the set of ROs.

In some cases, the first signal comprises a first synchronization signal block (SSB) and the plurality of signals comprises a plurality of SSBs. Additionally, in some cases, the mapping rule indicates that an RO of the set of ROs that overlaps with an SSB of the plurality of SSBs maps to the overlapped SSB. Additionally, in some cases, the first RO comprises the RO that that overlaps with an SSB of the plurality of SSBs and the first SSB comprises the overlapped SSB.

In some cases, the first signal comprises a first synchronization signal block (SSB) and the plurality of signals comprises a plurality of SSBs. Additionally, in some cases, the mapping rule indicates that SSBs of the plurality of SSBs are to be first sequentially mapped to ROs of a second plurality of ROs available for use by the second group of UEs, ignoring ROs in the set of ROs from the first plurality of ROs not available for use by the second group of UEs. Additionally, in some cases, the mapping rule indicates that remaining SSBs of the plurality of SSBs not mapped to ROs of the second plurality of ROs are to be sequentially mapped to ROs of the set of ROs from the first plurality of ROs not available for use by the second group of UEs starting at a particular SSB index.

In some case, the first signal comprises a first synchronization signal block (SSB) and the plurality of signals comprises a plurality of SSBs. Additionally, in some cases, the mapping rule indicates that SSBs of the plurality of SSBs are to be first sequentially mapped to ROs of a second plurality of ROs available for use by the second group of UEs, ignoring ROs in the set of ROs from the first plurality of ROs not available for use by the second group of UEs. Additionally, in some cases, the mapping rule indicates that remaining SSBs of the plurality of SSBs not mapped to ROs of the second plurality of ROs are to be sequentially mapped to ROs of the set of ROs from the first plurality of ROs not available for use by the second group of UEs according to a bitmap. Additionally, in some cases, the bitmap indicates the remaining SSBs to be sequentially mapped to the set of ROs from the first plurality of ROs not available for use by the second group of UEs.

In some cases, the plurality of signals comprises a plurality of CSI-RSs, and the mapping rule indicates CSI-RSs of the plurality of CSI-RSs to be mapped to the set of ROs from the first plurality of ROs not available for use by the second group of UEs.

In some cases, operations 600 further include transmitting one or more parameters associated with transmitting the random access preamble. In some cases, the one or more parameters comprise at least one of: a number of synchronization signal block (SSB) indices associated with one RO, or a number of contention-based random access preambles per synchronization signal block (SSB) index per RO included in the set of ROs.

In some cases, operations 600 further include transmitting one or more power related parameters. In some cases, the one or more power related parameters comprise at least one of: reference signal received power (RSRP) threshold for the plurality of signals transmitted by the BS, a target receive power for the plurality of signals transmitted by the BS, a power ramping step associated with the plurality of signals transmitted by the BS, or a number of retransmissions associated with the plurality of signals transmitted by the BS.

In some cases, operations 600 further comprise transmitting an uplink time advance offset for the set of ROs.

In some cases, operations 600 further comprise receiving a retransmitted random access preamble in a second RO, the second RO included in a second plurality of ROs that are available for use by the second group of UEs.

In some cases, operations 600 further comprise transmitting an indication indicating that the UE must use ROs in the set of ROs from the first plurality of ROs not available for use by the second group of UEs when transmitting the random access preamble and that the UE cannot use ROs from a second plurality of ROs available for use by the second group of UEs.

Figure 7:
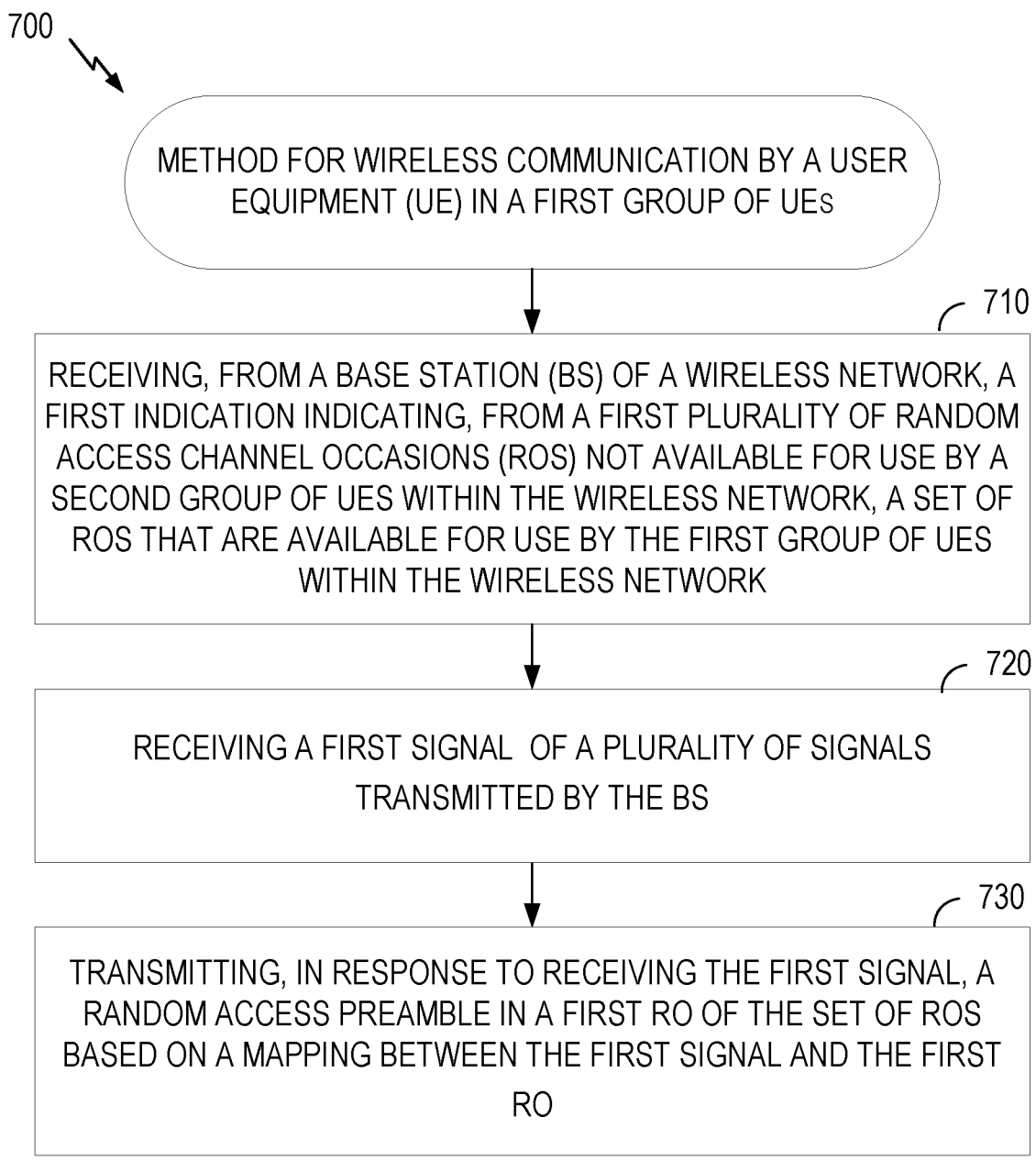
FIG. 7 is a flow diagram illustrating example operations for wireless communication by a user equipment.

FIG. 7 is a flow diagram illustrating example operations 700 for wireless communication, in accordance with certain aspects of the present disclosure. The operations 700 may be performed, for example, by a UE (e.g., such as the UE 104 in the wireless communication network 100 of FIG. 1) for facilitating the use of random access channel occasions for full-duplex. The operations 700 may be complementary to the operations 600 performed by the BS. The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begin, in block 710, with receiving, from a base station (BS) of a wireless network, a first indication indicating, from a first plurality of random access channel occasions (ROs) not available for use by a second group of UEs within the wireless network, a set of ROs that are available for use by the first group of UEs within the wireless network. In some cases, the set of ROs that are available for use by the first group of UEs within the wireless network include ROs associated with full-duplex communication.

In block 720, the UE receives a first signal of a plurality of signals transmitted by the BS.

In block 730, the UE transmits, in response to receiving the first signal, a random access preamble in a first RO of the set of ROs based on a mapping between the first signal and the first RO.

In some cases, the first indication indicating the set of ROs comprises an implicit indication based on information indicating that the BS supports full duplex communication.

In some cases, the first indication indicating the set of ROs comprises an explicit indication received in at least one of a system information block (SIB) or radio resource control (RRC) signaling.

In some cases, the set of ROs comprise all ROs in the first plurality of ROs not available for use by the second group of UEs.

In some cases, the set of ROs is based on a time division duplex (TDD) configuration. Additionally, in some cases, the set of ROs comprise ROs from the first plurality of ROs not available for use by the second group of UEs that: are located within flexible resources included in the TDD configuration or are located within full duplex resources included in the TDD configuration.

In some cases, the set of ROs is based on locations of SSBs transmitted by the BS. Additionally, in some cases, the set of ROs comprise ROs from the first plurality of ROs not available for use by the second group of UEs that, at least one of: do not precede a location of an SSB transmitted by the BS in a slot, or start after a threshold number of symbols after a last symbol location of an SSB in a slot.

In some cases, the first indication indicating the set of ROs comprises a bitmap, the bitmap including a plurality of bits, each bit of the plurality of bits corresponding to a different RO of the first plurality of ROs not available for use by the second group of UEs and indicating whether that corresponding different RO is available for use by the first group of UEs.

In some cases, the first signal comprises a first synchronization signal block (SSB) and the plurality of signals comprises a plurality of SSBs. Additionally, in some cases, the first indication indicating the set of ROs comprises a bitmap. Additionally, in some cases, the bitmap includes a plurality of bits. Additionally, in some cases, each bit of the plurality of bits corresponds to and indicates a different SSB index of the plurality of SSBs. Additionally, in some cases, each indicated different SSB index indicates a corresponding RO included within the set of ROs.

In some cases, the first signal comprises a first synchronization signal block (SSB). Additionally, in some cases, operations 700 may further include receiving a second indication indicating that the set of ROs includes all ROs of the first plurality of ROs not available for use by the second group of UEs and that the mapping between the first SSB and the first RO is based on a legacy mapping rule in which SSBs are sequentially mapped to ROs.

In some cases, the second indication comprises an explicit indication received in at least one of a system information block (SIB) or in radio resource control (RRC) signaling.

In some cases, the second indication comprises an implicit indication based on access control information indicating that the second group of UEs are barred from accessing the BS.

In some cases, operations 700 further include determining the mapping between the first signal and the first RO based on a mapping rule.

In some cases, the mapping rule is preconfigured in memory of the UE. In some cases, operations 700 further include receiving the mapping rule in a system information block (SIB) or in radio resource control (RRC) signaling.

In some cases, the first signal comprises a first synchronization signal block (SSB). Additionally, in some cases, the mapping rule indicates that an SSB index that maps to a second RO, not included in the set of ROs, preceding or following the first RO also maps to the first RO. Additionally, in some cases, the first SSB corresponds to SSB index that maps to the second RO not included in the set of ROs.

In some cases, the first signal comprises a first synchronization signal block (SSB) and the plurality of signals comprises a plurality of SSBs. Additionally, in some cases, the mapping rule indicates that an RO of the set of ROs that overlaps with an SSB of the plurality of SSBs maps to the overlapped SSB. Additionally, in some cases, the first RO comprises the RO that that overlaps with an SSB of the plurality of SSBs and the first SSB comprises the overlapped SSB.

In some cases, the first signal comprises a first synchronization signal block (SSB) and the plurality of signals comprises a plurality of SSBs. Additionally, in some cases, the mapping rule indicates that SSBs of the plurality of SSBs are to be first sequentially mapped to ROs of a second plurality of ROs available for use by the second group of UEs, ignoring ROs in the set of ROs from the first plurality of ROs not available for use by the second group of UEs. Additionally, in some cases, the mapping rule indicates that remaining SSBs of the plurality of SSBs not mapped to ROs of the second plurality of ROs are to be sequentially mapped to ROs of the set of ROs from the first plurality of ROs not available for use by the second group of UEs starting at a particular SSB index.

In some case, the first signal comprises a first synchronization signal block (SSB) and the plurality of signals comprises a plurality of SSBs. Additionally, in some cases, the mapping rule indicates that SSBs of the plurality of SSBs are to be first sequentially mapped to ROs of a second plurality of ROs available for use by the second group of UEs, ignoring ROs in the set of ROs from the first plurality of ROs not available for use by the second group of UEs. Additionally, in some cases, the mapping rule indicates that remaining SSBs of the plurality of SSBs not mapped to ROs of the second plurality of ROs are to be sequentially mapped to ROs of the set of ROs from the first plurality of ROs not available for use by the second group of UEs according to a bitmap. Additionally, in some cases, the bitmap indicates the remaining SSBs to be sequentially mapped to the set of ROs from the first plurality of ROs not available for use by the second group of UEs.

In some cases, the plurality of signals comprises a plurality of CSI-RSs, and the mapping rule indicates CSI-RSs of the plurality of CSI-RSs to be mapped to the set of ROs from the first plurality of ROs not available for use by the second group of UEs.

In some cases, operations 700 further include receiving one or more parameters associated with transmitting the random access preamble. In some cases, the one or more parameters comprise at least one of: a number of synchronization signal block (SSB) indices associated with one RO, or a number of contention-based random access preambles per synchronization signal block (SSB) index per RO included in the set of ROs.

In some cases, operations 700 further include receiving one or more power related parameters. In some cases, the one or more power related parameters comprise at least one of: reference signal received power (RSRP) threshold for the plurality of signals transmitted by the BS, a target receive power for the plurality of signals transmitted by the BS, a power ramping step associated with the plurality of signals transmitted by the BS, or a number of retransmissions associated with the plurality of signals transmitted by the BS.

In some cases, operations 700 further comprise receiving an uplink time advance offset for the set of ROs.

In some cases, operations 700 further include determining that the random access preamble needs to be retransmitted in a second RO. Additionally, in some cases, operations 700 further include, based on the determination, selecting the second RO from a second plurality of ROs that are available for use by the second group of UEs. Additionally, in some cases, operations 700 further include retransmitting the random access preamble in the selected second RO.

In some cases, operations 700 further comprise receiving an indication indicating that the UE must use ROs in the set of ROs from the first plurality of ROs not available for use by the second group of UEs when transmitting the random access preamble and that the UE cannot use ROs from a second plurality of ROs available for use by the second group of UEs.

Example Wireless Communication Devices

Figure 8:
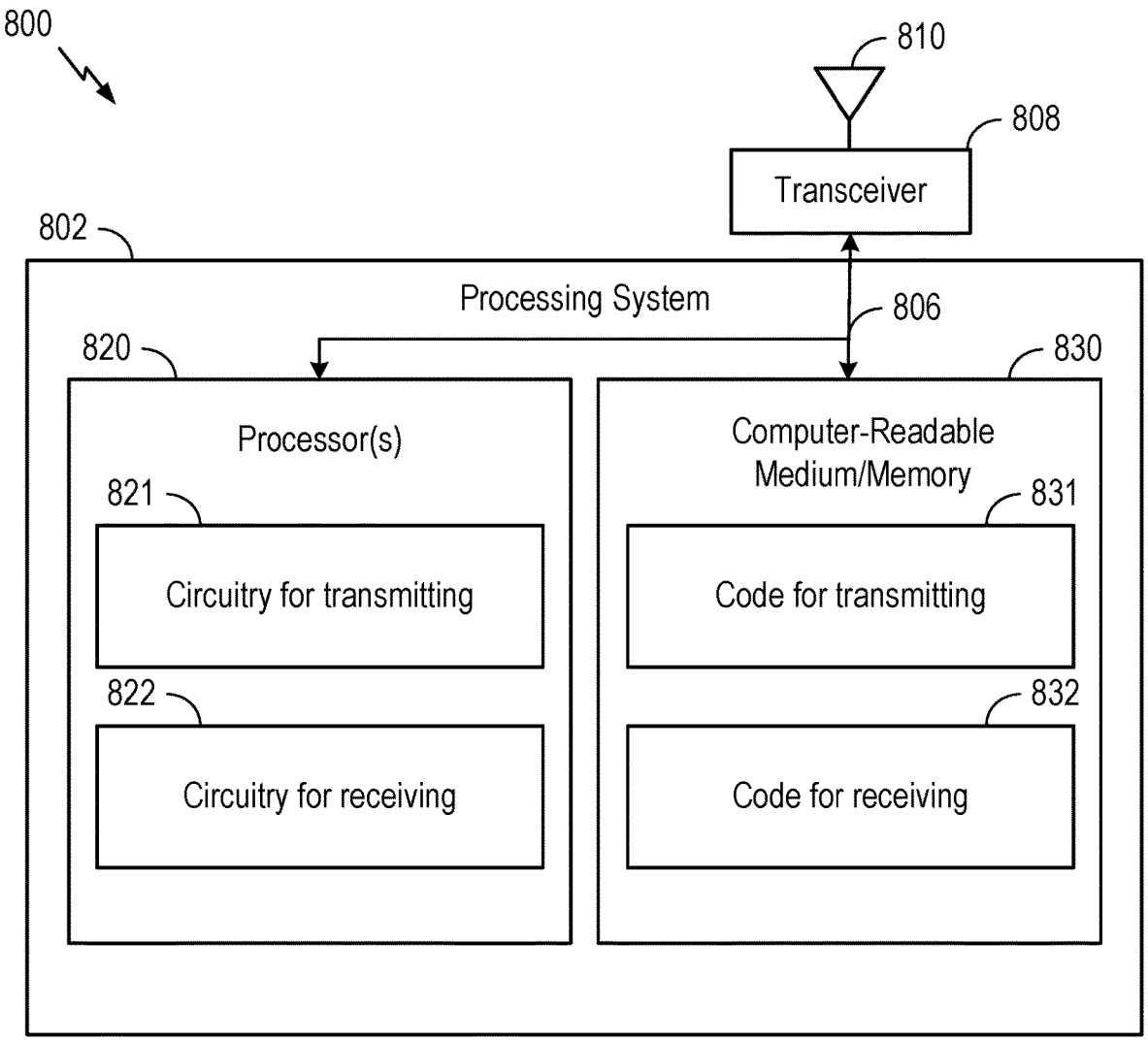
FIG. 8 illustrates an example wireless communications device configured to perform operations for the methods disclosed herein.

FIG. 8 depicts an example communications device 800 that includes various components operable, configured, or adapted to perform operations for the techniques disclosed herein, such as the operations depicted and described with respect to FIGS. 5-6. In some examples, communication device 800 may be a BS 102 as described, for example with respect to FIGS. 1 and 2.

Communications device 800 includes a processing system 802 coupled to a transceiver 808 (e.g., a transmitter and/or a receiver). Transceiver 808 is configured to transmit (or send) and receive signals for the communications device 800 via an antenna 810, such as the various signals as described herein. Processing system 802 may be configured to perform processing functions for communications device 800, including processing signals received and/or to be transmitted by communications device 800.

Processing system 802 includes one or more processors 820 coupled to a computer-readable medium/memory 830 via a bus 806. In certain aspects, computer-readable medium/memory 830 is configured to store instructions (e.g., computer-executable code) that when executed by the one or more processors 820, cause the one or more processors 820 to perform the operations illustrated in FIGS. 5-6, or other operations for performing the various techniques discussed herein for facilitating the use of random access channel occasions for full-duplex.

In the depicted example, computer-readable medium/memory 830 stores code 831 for transmitting and code 832 for receiving.

In the depicted example, the one or more processors 820 include circuitry configured to implement the code stored in the computer-readable medium/memory 830, including circuitry 821 for transmitting and circuitry 822 for receiving.

Various components of communications device 800 may provide means for performing the methods described herein, including with respect to FIGS. 5-6.

In some examples, means for transmitting or sending (or means for outputting for transmission) may include the transceivers 232 and/or antenna(s) 234 of the BS 102 illustrated in FIG. 2 and/or transceiver 808 and antenna 810 of the communication device 800 in FIG. 8.

In some examples, means for receiving (or means for obtaining) may include the transceivers 232 and/or antenna(s) 234 of the base station illustrated in FIG. 2 and/or transceiver 808 and antenna 810 of the communication device 800 in FIG. 8.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

Notably, FIG. 8 is an example, and many other examples and configurations of communication device 800 are possible.

Figure 9:
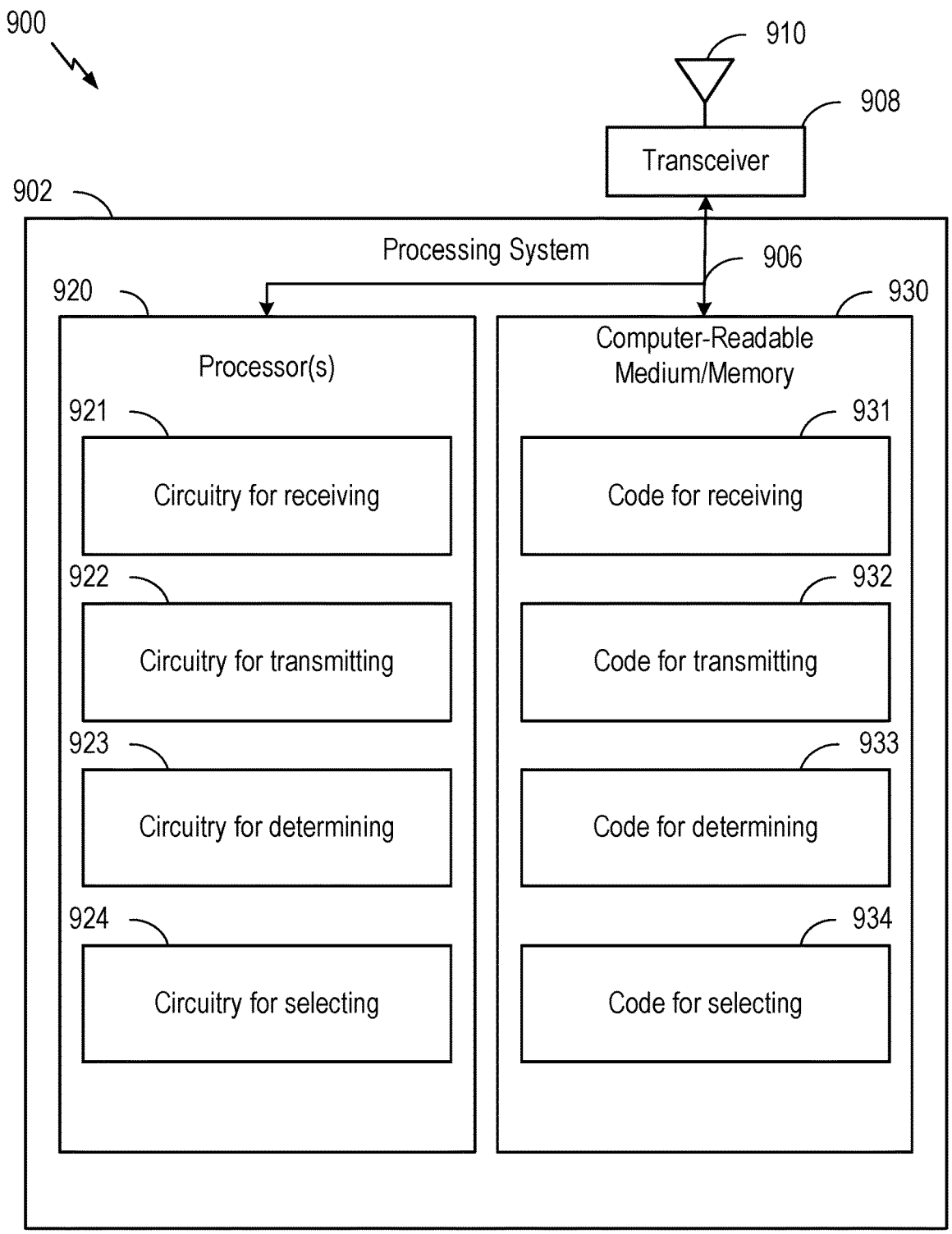
FIG. 9 illustrates an example wireless communications device configured to perform operations for the methods disclosed herein.

FIG. 9 depicts an example communications device 900 that includes various components operable, configured, or adapted to perform operations for the techniques disclosed herein, such as the operations depicted and described with respect to FIGS. 5 and 7. In some examples, communication device 900 may be a UE 104 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 5 and 7, or other operations for performing the various techniques discussed herein for facilitating the use of random access channel occasions for full-duplex.

In the depicted example, computer-readable medium/memory 930 stores code 931 for receiving, code 932 for (re)transmitting, code 933 for determining, and code 934 for selecting.

In the depicted example, the one or more processors 920 include circuitry configured to implement the code stored in the computer-readable medium/memory 930, including circuitry 921 for receiving, circuitry 922 for (re)transmitting, circuitry 923 for determining, and circuitry 924 for selecting Various components of communications device 900 may provide means for performing the methods described herein, including with respect to FIGS. 5 and 7.

In some examples, means for transmitting or sending (or means for outputting for transmission) may include the transceivers 254 and/or antenna(s) 252 of the UE 104 illustrated in FIG. 2 and/or transceiver 908 and antenna 910 of the communication device 900 in FIG. 9.

In some examples, means for receiving (or means for obtaining) may include the transceivers 254 and/or antenna(s) 252 of the UE 104 illustrated in FIG. 2 and/or transceiver 908 and antenna 910 of the communication device 900 in FIG. 9.

In some examples, means for determining and means for selecting may include various processing system components, such as: the one or more processors 920 in FIG. 9, or aspects of the UE 104 depicted in FIG. 2, including receive processor 258, transmit processor 264, TX MIMO processor 266, and/or controller/processor 280 (including FD RO component 281).

Notably, FIG. 9 is an example, and many other examples and configurations of communication device 900 are possible.

Example Clauses

Implementation examples are described in the following numbered clauses:

Clause 1: A method for wireless communication by a user equipment (UE) of a first group of UEs, comprising: receiving, from a base station (BS) of a wireless network, a first indication indicating, from a first plurality of random access channel occasions (ROs) not available for use by a second group of UEs within the wireless network, a set of ROs that are available for use by the first group of UEs within the wireless network, wherein the set of ROs that are available for use by the first group of UEs within the wireless network include ROs associated with full-duplex communication; receiving a first signal of a plurality of signals transmitted by the BS; and transmitting, in response to receiving the first signal, a random access preamble in a first RO of the set of ROs based on a mapping between the first signal and the first RO.

Clause 2: The method of Clause 1, wherein the first indication indicating the set of ROs comprises an implicit indication based on information indicating that the BS supports full duplex communication.

Clause 3: The method of Clause 1, wherein the first indication indicating the set of ROs comprises an explicit indication received in at least one of a system information block (SIB) or radio resource control (RRC) signaling.

Clause 4: The method of an one of Clauses 1-3, wherein the set of ROs comprise all ROs in the first plurality of ROs not available for use by the second group of UEs.

Clause 5: The method of any one of Clauses 1-3, wherein: the set of ROs is based on a time division duplex (TDD) configuration, and the set of ROs comprise ROs from the first plurality of ROs not available for use by the second group of UEs that: are located within flexible resources included in the TDD configuration, or are located within full duplex resources included in the TDD configuration.

Clause 6: The method of any one of Clauses 1-3 or 5, wherein: the set of ROs is based on locations of SSBs transmitted by the BS, and the set of ROs comprise ROs from the first plurality of ROs not available for use by the second group of UEs that, at least one of: do not precede a location of an SSB transmitted by the BS in a slot, or start after a threshold number of symbols after a last symbol location of an SSB in a slot.

Clause 7: The method of any one of Clauses 1-6, wherein the first indication indicating the set of ROs comprises a bitmap, the bitmap including a plurality of bits, each bit of the plurality of bits corresponding to a different RO of the first plurality of ROs not available for use by the second group of UEs and indicating whether that corresponding different RO is available for use by the first group of UEs.

Clause 8: The method of any one of Clauses 1-6, wherein: the first signal comprises a first synchronization signal block (SSB) and the plurality of signals comprises a plurality of SSBs, the first indication indicating the set of ROs comprises a bitmap, the bitmap includes a plurality of bits, each bit of the plurality of bits corresponds to and indicates a different SSB index of the plurality of SSBs, and each indicated different SSB index indicates a corresponding RO included within the set of ROs.

Clause 9: The method of any one of Clauses 1-8, wherein: the first signal comprises a first synchronization signal block (SSB), and the method further comprises receiving a second indication indicating that the set of ROs includes all ROs of the first plurality of ROs not available for use by the second group of UEs and that the mapping between the first SSB and the first RO is based on a legacy mapping rule in which SSBs are sequentially mapped to ROs.

Clause 10: The method of Clause 9, wherein the second indication comprises an explicit indication received in at least one of a system information block (SIB) or in radio resource control (RRC) signaling.

Clause 11: The method of Clause 9, wherein the second indication comprises an implicit indication based on access control information indicating that the second group of UEs are barred from accessing the BS.

Clause 12: The method of any one of Clauses 1-11, further comprising determining the mapping between the first signal and the first RO based on a mapping rule.

Clause 13: The method of Clause 12, wherein: the mapping rule is preconfigured in memory of the UE, or the method further comprises receiving the mapping rule in a system information block (SIB) or in radio resource control (RRC) signaling.

Clause 14: The method of any one of Clauses 12-13, wherein: the first signal comprises a first synchronization signal block (SSB), the mapping rule indicates that an SSB index that maps to a second RO, not included in the set of ROs, preceding or following the first RO also maps to the first RO, and the first SSB corresponds to SSB index that maps to the second RO not included in the set of ROs.

Clause 15: The method of any one of Clauses 12-14, wherein: the first signal comprises a first synchronization signal block (SSB) and the plurality of signals comprises a plurality of SSBs, the mapping rule indicates that an RO of the set of ROs that overlaps with an SSB of the plurality of SSBs maps to the overlapped SSB, and the first RO comprises the RO that that overlaps with an SSB of the plurality of SSBs and the first SSB comprises the overlapped SSB.

Clause 16: The method of any one of Clauses 12-15, wherein: the first signal comprises a first synchronization signal block (SSB) and the plurality of signals comprises a plurality of SSBs, and the mapping rule indicates that: SSBs of the plurality of SSBs are to be first sequentially mapped to ROs of a second plurality of ROs available for use by the second group of UEs, ignoring ROs in the set of ROs from the first plurality of ROs not available for use by the second group of UEs, and remaining SSBs of the plurality of SSBs not mapped to ROs of the second plurality of ROs are to be sequentially mapped to ROs of the set of ROs from the first plurality of ROs not available for use by the second group of UEs starting at a particular SSB index.

Clause 17: The method of any one of Clauses 12-16, wherein: the first signal comprises a first synchronization signal block (SSB) and the plurality of signals comprises a plurality of SSBs, and the mapping rule indicates that: SSBs of the plurality of SSBs are to be first sequentially mapped to ROs of a second plurality of ROs available for use by the second group of UEs, ignoring ROs in the set of ROs from the first plurality of ROs not available for use by the second group of UEs, remaining SSBs of the plurality of SSBs not mapped to ROs of the second plurality of ROs are to be sequentially mapped to ROs of the set of ROs from the first plurality of ROs not available for use by the second group of UEs according to a bitmap, and the bitmap indicates the remaining SSBs to be sequentially mapped to the set of ROs from the first plurality of ROs not available for use by the second group of UEs.

Clause 18: The method of any one of Clauses 12-17, wherein: the plurality of signals comprises a plurality of CSI-RSs, and the mapping rule indicates CSI-RSs of the plurality of CSI-RSs to be mapped to the set of ROs from the first plurality of ROs not available for use by the second group of UEs.

Clause 19: The method of any one of Clauses 1-18, further comprising receiving one or more parameters associated with transmitting the random access preamble, wherein the one or more parameters comprise at least one of: a number of synchronization signal block (SSB) indices associated with one RO, or a number of contention-based random access preambles per synchronization signal block (SSB) index per RO included in the set of ROs.

Clause 20: The method of any one of Clauses 1-19, further comprising receiving one or more power related parameters, wherein the one or more power related parameters comprise at least one of: reference signal received power (RSRP) threshold for the plurality of signals transmitted by the BS, a target receive power for the plurality of signals transmitted by the BS; a power ramping step associated with the plurality of signals transmitted by the BS; or a number of retransmissions associated with the plurality of signals transmitted by the BS.

Clause 21: The method of any one of Clauses 1-20, further comprising receiving an uplink time advance offset for the set of ROs.

Clause 22: The method of any one of Clauses 1-21, further comprising: determining that the random access preamble needs to be retransmitted in a second RO; based on the determination, selecting the second RO from a second plurality of ROs that are available for use by the second group of UEs; and retransmitting the random access preamble in the selected second RO.

Clause 23: The method of any one of Clauses 1-22, further comprising receiving a second indication indicating that the UE must use ROs in the set of ROs from the first plurality of ROs not available for use by the second group of UEs when transmitting the random access preamble and that the UE cannot use ROs from a second plurality of ROs available for use by the second group of UEs.

Clause 24: A method for wireless communication by a base station (BS), comprising: transmitting, to a user equipment (UE) of a first group of UEs in a wireless network, a first indication indicating, from a first plurality of random access channel occasions (ROs) not available for use by a second group of UEs within the wireless network, a set of ROs that are available for use by the first group of UEs within the wireless network, wherein the set of ROs that are available for use by the first group of UEs within the wireless network include ROs associated with full-duplex communication; transmitting a first signal of a plurality of signals to the UE; and receiving, in response to receiving the first signal, a random access preamble in a first RO of the set of ROs based on a mapping between the first signal and the first RO.

Clause 25: The method of Clause 24, wherein the first indication indicating the set of ROs comprises an implicit indication based on information indicating that the BS supports full duplex communication.

Clause 26: The method of Clause 24, wherein the first indication indicating the set of ROs comprises an explicit indication received in at least one of a system information block (SIB) or radio resource control (RRC) signaling.

Clause 27: The method of any one of Clauses 24-26, wherein the set of ROs comprise all ROs in the first plurality of ROs not available for use by the second group of UEs.

Clause 28: The method of any one of Clauses 24-26, wherein: the set of ROs is based on a time division duplex (TDD) configuration, and the set of ROs comprise ROs from the first plurality of ROs not available for use by the second group of UEs that: are located within flexible resources included in the TDD configuration, or are located within full duplex resources included in the TDD configuration.

Clause 29: The method of any one of Clauses 24-26 or 28, wherein: the set of ROs is based on locations of SSBs transmitted by the BS, and the set of ROs comprise ROs from the first plurality of ROs not available for use by the second group of UEs that, at least one of: do not precede a location of an SSB transmitted by the BS in a slot, or start after a threshold number of symbols after a last symbol location of an SSB in a slot.

Clause 30: The method of any one of Clauses 24-29, wherein the first indication indicating the set of ROs comprises a bitmap, the bitmap including a plurality of bits, each bit of the plurality of bits corresponding to a different RO of the first plurality of ROs not available for use by the second group of UEs and indicating whether that corresponding different RO is available for use by the first group of UEs.

Clause 31: The method of any one of Clauses 24-29, wherein: the first signal comprises a first synchronization signal block (SSB) and the plurality of signals comprises a plurality of SSBs, the first indication indicating the set of ROs comprises a bitmap, the bitmap includes a plurality of bits, each bit of the plurality of bits corresponds to and indicates a different SSB index of the plurality of SSBs, and each indicated different SSB index indicates a corresponding RO included within the set of ROs.

Clause 32: The method of any one of Clauses 24-31, wherein: the first signal comprises a first synchronization signal block (SSB), and the method further comprises transmitting a second indication indicating that the set of ROs includes all ROs of the first plurality of ROs not available for use by the second group of UEs and that the mapping between the first SSB and the first RO is based on a legacy mapping rule in which SSBs are sequentially mapped to ROs.

Clause 33: The method of Clause 32, wherein the second indication comprises an explicit indication received in at least one of a system information block (SIB) or in radio resource control (RRC) signaling.

Clause 34: The method of Clause 32, wherein the second indication comprises an implicit indication based on access control information indicating that the second group of UEs are barred from accessing the BS.

Clause 35: The method of any one of Clauses 24-334, wherein the mapping between the first signal and the first RO is based on a mapping rule.

Clause 36: The method of Clause 35, wherein: the mapping rule is preconfigured in memory of the UE, or the method further comprises transmitting the mapping rule in a system information block (SIB) or in radio resource control (RRC) signaling.

Clause 37: The method of any one of Clauses 35-36, wherein: the first signal comprises a first synchronization signal block (SSB), the mapping rule indicates that an SSB index that maps to a second RO, not included in the set of ROs, preceding or following the first RO also maps to the first RO, and the first SSB corresponds to SSB index that maps to the second RO not included in the set of ROs.

Clause 38: The method of any one of Clauses 35-37, wherein: the first signal comprises a first synchronization signal block (SSB) and the plurality of signals comprises a plurality of SSBs, the mapping rule indicates that an RO of the set of ROs that overlaps with an SSB of the plurality of SSBs maps to the overlapped SSB, and the first RO comprises the RO that that overlaps with an SSB of the plurality of SSBs and the first SSB comprises the overlapped SSB.

Clause 39: The method of any one of Clauses 35-38, wherein: the first signal comprises a first synchronization signal block (SSB) and the plurality of signals comprises a plurality of SSBs, and the mapping rule indicates that: SSBs of the plurality of SSBs are to be first sequentially mapped to ROs of a second plurality of ROs available for use by the second group of UEs, ignoring ROs in the set of ROs from the first plurality of ROs not available for use by the second group of UEs, and remaining SSBs of the plurality of SSBs not mapped to ROs of the second plurality of ROs are to be sequentially mapped to ROs of the set of ROs from the first plurality of ROs not available for use by the second group of UEs starting at a particular SSB index.

Clause 40: The method of any one of Clauses 35-39, wherein: the first signal comprises a first synchronization signal block (SSB) and the plurality of signals comprises a plurality of SSBs, and the mapping rule indicates that: SSBs of the plurality of SSBs are to be first sequentially mapped to ROs of a second plurality of ROs available for use by the second group of UEs, ignoring ROs in the set of ROs from the first plurality of ROs not available for use by the second group of UEs, remaining SSBs of the plurality of SSBs not mapped to ROs of the second plurality of ROs are to be sequentially mapped to ROs of the set of ROs from the first plurality of ROs not available for use by the second group of UEs according to a bitmap, and the bitmap indicates the remaining SSBs to be sequentially mapped to the set of ROs from the first plurality of ROs not available for use by the second group of UEs.

Clause 41: The method of any one of Clauses 35-40, wherein: the plurality of signals comprises a plurality of CSI-RSs, and the mapping rule indicates CSI-RSs of the plurality of CSI-RSs to be mapped to the set of ROs from the first plurality of ROs not available for use by the second group of UEs.

Clause 42: The method of any one of Clauses 24-41, further comprising transmitting one or more parameters associated with transmitting the random access preamble, wherein the one or more parameters comprise at least one of: a number of synchronization signal block (SSB) indices associated with one RO, or a number of contention-based random access preambles per synchronization signal block (SSB) index per RO included in the set of ROs.

Clause 43: The method of any one of Clauses 24-42, further comprising transmitting one or more power related parameters, wherein the one or more power related parameters comprise at least one of: reference signal received power (RSRP) threshold for the plurality of signals transmitted by the BS, a target receive power for the plurality of signals transmitted by the BS; a power ramping step associated with the plurality of signals transmitted by the BS; or a number of retransmissions associated with the plurality of signals transmitted by the BS.

Clause 44: The method of any one of Clauses 24-43, further comprising transmitting an uplink time advance offset for the set of ROs.

Clause 45: The method of any one of Clauses 24-44, further comprising receiving a retransmitted random access preamble in a second RO, the second RO included in a second plurality of ROs that are available for use by the second group of UEs.

Clause 46: The method of any one of Clauses 24-45, further comprising transmitting a second indication indicating that the UE must use ROs in the set of ROs from the first plurality of ROs not available for use by the second group of UEs when transmitting the random access preamble and that the UE cannot use ROs from a second plurality of ROs available for use by the second group of UEs.

Clause 47: An apparatus, comprising: a memory comprising executable instructions; and one or more processors configured to execute the executable instructions and cause the apparatus to perform a method in accordance with any one of Clauses 1-46.

Clause 48: An apparatus, comprising means for performing a method in accordance with any one of Clauses 1-46.

Clause 49: A non-transitory computer-readable medium comprising executable instructions that, when executed by one or more processors of an apparatus, cause the apparatus to perform a method in accordance with any one of Clauses 1-46.

Clause 50: A computer program product embodied on a computer-readable storage medium comprising code for performing a method in accordance with any one of Clauses 1-46.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of facilitating the use of random access channel occasions for full-duplex in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE) of a first group of UEs, comprising:
   receiving, from a base station (BS) of a wireless network, a first indication indicating, from a first plurality of random access channel occasions (ROs), a set of ROs that are available for use by the first group of UEs within the wireless network,
   wherein:
   the first plurality of ROs comprise ROs for use by the both the first group of UEs and a second group of UEs, the first plurality of ROs is not available for the second group of UEs within the wireless network due to an overlapping downlink transmission, and the set of ROs that are available for use by the first group of UEs within the wireless network include ROs associated with full-duplex communication;

receiving a first signal of a plurality of signals transmitted by the BS; and transmitting, in response to receiving the first signal, a random access preamble in a first RO of the set of ROs based on a mapping between the first signal and the first RO.

2. The method of claim 1, wherein the first indication indicating the set of ROs comprises an implicit indication based on information indicating that the BS supports full duplex communication.

3. The method of claim 1, wherein the first indication indicating the set of ROs comprises an explicit indication received in at least one of a system information block (SIB) or radio resource control (RRC) signaling.

4. The method of claim 1, wherein the set of ROs comprise all ROs in the first plurality of ROs not available for the second group of UEs.

5. The method of claim 1, wherein:
the set of ROs is based on a time division duplex (TDD) configuration, and
the set of ROs comprise ROs from the first plurality of ROs not available for the second group of UEs that:
are located within flexible resources included in the TDD configuration, or
are located within full duplex resources included in the TDD configuration.

6. The method of claim 1, wherein:
the set of ROs is based on locations of synchronization signal blocks (SSBs) transmitted by the BS, and
the set of ROs comprise ROs from the first plurality of ROs not available for the second group of UEs that, at least one of:
do not precede a location of an SSB transmitted by the BS in a slot, or
start after a threshold number of symbols after a last symbol location of an SSB in a slot.

7. The method of claim 1, wherein the first indication indicating the set of ROs comprises a bitmap, the bitmap including a plurality of bits, each bit of the plurality of bits corresponding to a different RO of the first plurality of ROs not available for the second group of UEs and indicating whether that corresponding different RO is available for use by the first group of UEs.

8. The method of claim 1, wherein:
the first signal comprises a first synchronization signal block (SSB) and the plurality of signals comprises a plurality of SSBs,
the first indication indicating the set of ROs comprises a bitmap,
the bitmap includes a plurality of bits,
each bit of the plurality of bits corresponds to and indicates a different SSB index of the plurality of SSBs, and
each indicated different SSB index indicates a corresponding RO included within the set of ROs.

9. The method of claim 1, wherein:
the first signal comprises a first synchronization signal block (SSB), and
the method further comprises receiving a second indication indicating that the set of ROs includes all ROs of the first plurality of ROs not available for the second group of UEs and that the mapping between the first SSB and the first RO is based on a legacy mapping rule in which SSBs are sequentially mapped to ROs.

10. The method of claim 9, wherein the second indication comprises an explicit indication received in at least one of a system information block (SIB) or in radio resource control (RRC) signaling.

11. The method of claim 9, wherein the second indication comprises an implicit indication based on access control information indicating that the second group of UEs are barred from accessing the BS.

12. The method of claim 1, further comprising determining the mapping between the first signal and the first RO based on a mapping rule.

13. The method of claim 12, wherein:
the mapping rule is preconfigured in memory of the UE, or
the method further comprises receiving the mapping rule in a system information block (SIB) or in radio resource control (RRC) signaling.

14. The method of claim 12, wherein:
the first signal comprises a first synchronization signal block (SSB),
the mapping rule indicates that an SSB index that maps to a second RO, not included in the set of ROs, preceding or following the first RO also maps to the first RO, and
the first SSB corresponds to SSB index that maps to the second RO not included in the set of ROs.

15. The method of claim 12, wherein:
the first signal comprises a first synchronization signal block (SSB) and the plurality of signals comprises a plurality of SSBs,
the mapping rule indicates that an RO of the set of ROs that overlaps with an SSB of the plurality of SSBs maps to the overlapped SSB, and
the first RO comprises the RO that that overlaps with an SSB of the plurality of SSBs and the first SSB comprises the overlapped SSB.

16. The method of claim 12, wherein:
the first signal comprises a first synchronization signal block (SSB) and the plurality of signals comprises a plurality of SSBs, and
the mapping rule indicates that:
SSBs of the plurality of SSBs are to be first sequentially mapped to ROs of a second plurality of ROs available for use by the second group of UEs, ignoring ROs in the set of ROs from the first plurality of ROs not available for the second group of UEs, and
remaining SSBs of the plurality of SSBs not mapped to ROs of the second plurality of ROs are to be sequentially mapped to ROs of the set of ROs from the first plurality of ROs not available for the second group of UEs starting at a particular SSB index.

17. The method of claim 12, wherein:
the first signal comprises a first synchronization signal block (SSB) and the plurality of signals comprises a plurality of SSBs, and
the mapping rule indicates that:
SSBs of the plurality of SSBs are to be first sequentially mapped to ROs of a second plurality of ROs available for use by the second group of UEs, ignoring ROs in the set of ROs from the first plurality of ROs not available for the second group of UEs,
remaining SSBs of the plurality of SSBs not mapped to ROs of the second plurality of ROs are to be sequentially mapped to ROs of the set of ROs from the first plurality of ROs not available for the second group of UEs according to a bitmap, and the bitmap indicates the remaining SSBs to be sequentially mapped to the set of ROs from the first plurality of ROs not available for the second group of UEs.

18. The method of claim 12, wherein:
the plurality of signals comprises a plurality of CSI-RSs, and
the mapping rule indicates CSI-RSs of the plurality of CSI-RSs to be mapped to the set of ROs from the first plurality of ROs not available for the second group of UEs.

19. The method of claim 1, further comprising receiving one or more parameters associated with transmitting the random access preamble, wherein the one or more parameters comprise at least one of:
a number of synchronization signal block (SSB) indices associated with one RO, or
a number of contention-based random access preambles per synchronization signal block (SSB) index per RO included in the set of ROs.

20. The method of claim 1, further comprising receiving one or more power related parameters, wherein the one or more power related parameters comprise at least one of:
reference signal received power (RSRP) threshold for the plurality of signals transmitted by the BS,
a target receive power for the plurality of signals transmitted by the BS;
a power ramping step associated with the plurality of signals transmitted by the BS; or
a number of retransmissions associated with the plurality of signals transmitted by the BS.

21. The method of claim 1, further comprising receiving an uplink time advance offset for the set of ROs.

22. The method of claim 1, further comprising:
determining that the random access preamble needs to be retransmitted in a second RO;
based on the determination, selecting the second RO from a second plurality of ROs that are available for use by the second group of UEs; and
retransmitting the random access preamble in the selected second RO.

23. The method of claim 1, further comprising receiving a second indication indicating that the UE must use ROs in the set of ROs from the first plurality of ROs not available for the second group of UEs when transmitting the random access preamble and that the UE cannot use ROs from a second plurality of ROs available for use by the second group of UEs.

24. A user equipment (UE), comprising:
one or more processors configured to execute the instructions stored on one or more memories and to cause the UE to:
receive, from a base station (BS) of a wireless network, a first indication indicating, from a first plurality of random access channel occasions (ROs), a set of ROs that are available for use by a first group of UEs, including the UE, within the wireless network, wherein:
the first plurality of ROs comprise ROs for use by the both the first group of UEs and a second group of UEs,
the first plurality of ROs is not available for the second group of UEs within the wireless network due to an overlapping downlink transmission; and
the set of ROs that are available for use by the first group of UEs within the wireless network include ROs associated with full-duplex communication;

receive a first signal of a plurality of signals transmitted by the BS; and
transmit, in response to receiving the first signal, a random access preamble in a first RO of the set of ROs based on a mapping between the first signal and the first RO.

25. The UE of claim 24, wherein:
the set of ROs is based on a time division duplex (TDD) configuration, and
the set of ROs comprise ROs from the first plurality of ROs not available for the second group of UEs that:
are located within flexible resources included in the TDD configuration, or
are located within full duplex resources included in the TDD configuration.

26. The UE of claim 24, wherein:
the set of ROs is based on locations of synchronization signal blocks (SSBs) transmitted by the BS, and
the set of ROs comprise ROs from the first plurality of ROs not available for the second group of UEs that, at least one of:
do not precede a location of an SSB transmitted by the BS in a slot, or
start after a threshold number of symbols after a last symbol location of an SSB in a slot.

27. The UE of claim 24, wherein the one or more processors are further configured to cause the UE to determine the mapping between the first signal and the first RO based on a mapping rule, wherein:
the first signal comprises a first synchronization signal block (SSB) and the plurality of signals comprises a plurality of SSBs,
the mapping rule indicates that an RO of the set of ROs that overlaps with an SSB of the plurality of SSBs maps to the overlapped SSB, and
the first RO comprises the RO that that overlaps with an SSB of the plurality of SSBs and the first SSB comprises the overlapped SSB.

28. The UE of claim 24, wherein the one or more processors are further configured to cause the UE to determine the mapping between the first signal and the first RO based on a mapping rule, wherein:
the first signal comprises a first synchronization signal block (SSB) and the plurality of signals comprises a plurality of SSBs, and
the mapping rule indicates that:
SSBs of the plurality of SSBs are to be first sequentially mapped to ROs of a second plurality of ROs available for use by the second group of UEs, ignoring ROs in the set of ROs from the first plurality of ROs not available for the second group of UEs, and
remaining SSBs of the plurality of SSBs not mapped to ROs of the second plurality of ROs are to be sequentially mapped to ROs of the set of ROs from the first plurality of ROs not available for the second group of UEs starting at a particular SSB index.

29. A user equipment (UE), comprising:
means for receiving, from a base station (BS) of a wireless network, a first indication indicating, from a first plurality of random access channel occasions (ROs), a set of ROs that are available for use by a first group of UEs, including the UE, within the wireless network, wherein:
the first plurality of ROs comprise ROs for use by the both the first group of UEs and a second group of UEs, the first plurality of ROs is not available for the second group of UEs within the wireless network due to an overlapping downlink transmission; and the set of ROs that are available for use by the first group of UEs within the wireless network include ROs associated with full-duplex communication;

means for receiving a first signal of a plurality of signals transmitted by the BS; and means for transmitting, in response to receiving the first signal, a random access preamble in a first RO of the set of ROs based on a mapping between the first signal and the first RO.

30. A non-transitory computer-readable medium, comprising:

executable instructions that, when executed by one or more processors of a user equipment (UE), cause the UE to:

receive, from a base station (BS) of a wireless network, a first indication indicating, from a first plurality of random access channel occasions (ROs), a set of ROs that are available for use by a first group of UEs, including the UE, within the wireless network, wherein:

the first plurality of ROs comprise ROs for use by the both the first group of UEs and a second group of UEs, the first plurality of ROs is not available for the second group of UEs within the wireless network due to an overlapping downlink transmission; and the set of ROs that are available for use by the first group of UEs within the wireless network include ROs associated with full-duplex communication;

receive a first signal of a plurality of signals transmitted by the BS; and transmit, in response to receiving the first signal, a random access preamble in a first RO of the set of ROs based on a mapping between the first signal and the first RO.

* * * * *